US012354422B2

(12) United States Patent
Cate et al.

(10) Patent No.: US 12,354,422 B2
(45) Date of Patent: Jul. 8, 2025

(54) MOVABLE BARRIER OPERATOR AND TRANSMITTER PAIRING OVER A NETWORK

(71) Applicant: The Chamberlain Group LLC, Oak Brook, IL (US)

(72) Inventors: Casparus Cate, Lombard, IL (US); Garth Wesley Hopkins, Lisle, IL (US); Oddy Khamharn, Lombard, IL (US); Mark Edward Miller, Middleton, WI (US); Cory Sorice, Tampa, FL (US)

(73) Assignee: The Chamberlain Group LLC, Oak Brook, IL (US)

( * ) Notice: Subject to any disclaimer, the term of this patent is extended or adjusted under 35 U.S.C. 154(b) by 0 days.

(21) Appl. No.: 18/528,435

(22) Filed: Dec. 4, 2023

(65) Prior Publication Data

US 2024/0177548 A1 May 30, 2024

Related U.S. Application Data

(63) Continuation of application No. 17/879,927, filed on Aug. 3, 2022, now Pat. No. 11,869,289, which is a (Continued)

(51) Int. Cl.
*G07C 9/00* (2020.01)

(52) U.S. Cl.
CPC ..... *G07C 9/00309* (2013.01); *G07C 9/00857* (2013.01); *G07C 9/00896* (2013.01);

(Continued)

(58) Field of Classification Search
CPC ............ G07C 9/00309; G07C 9/00857; G07C 9/00896; G07C 2009/00452;

(Continued)

(56) References Cited

U.S. PATENT DOCUMENTS

| | | | |
|---|---|---|---|
| 29,525 | A | 8/1860 | Sherman |
| 30,957 | A | 12/1860 | Campbell |

(Continued)

FOREIGN PATENT DOCUMENTS

| | | | |
|---|---|---|---|
| AU | 645228 | B | 1/1994 |
| AU | 710682 | B | 9/1999 |

(Continued)

OTHER PUBLICATIONS

Notice of Allowance, dated Sep. 7, 2023, by the USPTO, re U.S. Appl. No. 17/879,927, 7 pages.

(Continued)

*Primary Examiner* — Curtis J King
(74) *Attorney, Agent, or Firm* — Foley IP Law, PLLC

(57) ABSTRACT

In one aspect of the present disclosure, a system and method are provided for pairing a network-enabled movable barrier operator with a transmitter. The method may include receiving a pairing request, retrieving a hashed version of the transmitter fixed code, verifying access authorization, and forwarding the hashed version of the transmitter fixed code to a movable barrier operator to allow the movable barrier operator to determine whether a new transmitter is authorized to control the movable barrier operator.

20 Claims, 12 Drawing Sheets

Related U.S. Application Data continuation of application No. 16/528,376, filed on Jul. 31, 2019, now Pat. No. 11,423,717.

(60) Provisional application No. 62/812,642, filed on Mar. 1, 2019, provisional application No. 62/786,837, filed on Dec. 31, 2018, provisional application No. 62/713,527, filed on Aug. 1, 2018.

(52) U.S. Cl.
CPC .............. *G07C 2009/00452* (2013.01); *G07C 2009/00468* (2013.01); *G07C 2009/00865* (2013.01); *G07C 2009/00928* (2013.01)

(58) Field of Classification Search
CPC ........... G07C 2009/00468; G07C 2009/00865; G07C 2009/00928; G07C 9/00571; G07C 2009/00793
See application file for complete search history.

(56) References Cited

U.S. PATENT DOCUMENTS

| | | | |
|---|---|---|---|
| 35,364 | A | 5/1862 | Cox |
| 803,047 | A | 10/1905 | Browne |
| 2,405,500 | A | 8/1946 | Guanella |
| 2,963,270 | A | 12/1960 | Magarian |
| 3,716,865 | A | 2/1973 | Willmott |
| 3,735,106 | A | 5/1973 | Hollaway |
| 3,792,446 | A | 2/1974 | Mc et al. |
| 3,798,359 | A | 3/1974 | Feistel |
| 3,798,360 | A | 3/1974 | Feistel |
| 3,798,544 | A | 3/1974 | Norman |
| 3,798,605 | A | 3/1974 | Feistel |
| 3,845,277 | A | 10/1974 | Spetz et al. |
| 3,890,601 | A | 6/1975 | Pietrolewicz |
| 3,906,348 | A | 9/1975 | Willmott |
| 3,938,091 | A | 2/1976 | Atalla et al. |
| 4,037,201 | A | 7/1977 | Willmott |
| 4,064,404 | A | 12/1977 | Willmott et al. |
| RE29,525 | E | 1/1978 | Willmott |
| 4,078,152 | A | 3/1978 | Tuckerman, III |
| 4,097,859 | A | 6/1978 | Looschen |
| 4,138,735 | A | 2/1979 | Allocca et al. |
| 4,178,549 | A | 12/1979 | Ledenbach et al. |
| 4,195,196 | A | 3/1980 | Feistel |
| 4,195,200 | A | 3/1980 | Feistel |
| 4,196,310 | A | 4/1980 | Forman et al. |
| 4,218,738 | A | 8/1980 | Matyas et al. |
| 4,243,976 | A | 1/1981 | Warner et al. |
| 4,255,742 | A | 3/1981 | Gable et al. |
| 4,304,962 | A | 12/1981 | Fracassi et al. |
| 4,305,060 | A | 12/1981 | Apple et al. |
| 4,316,055 | A | 2/1982 | Feistel |
| 4,326,098 | A | 4/1982 | Bouricius et al. |
| 4,327,444 | A | 4/1982 | Court |
| 4,328,414 | A | 5/1982 | Atalla |
| 4,328,540 | A | 5/1982 | Matsuoka et al. |
| RE30,957 | E | 6/1982 | Feistel |
| 4,380,762 | A | 4/1983 | Capasso |
| 4,385,296 | A | 5/1983 | Tsubaki et al. |
| 4,387,455 | A | 6/1983 | Schwartz |
| 4,387,460 | A | 6/1983 | Boutmy et al. |
| 4,393,269 | A | 7/1983 | Konheim et al. |
| 4,418,333 | A | 11/1983 | Schwarzbach et al. |
| 4,426,637 | A | 1/1984 | Apple et al. |
| 4,445,712 | A | 5/1984 | Smagala-Romanoff |
| 4,447,890 | A | 5/1984 | Duwel et al. |
| 4,454,509 | A | 6/1984 | Buennagel et al. |
| 4,464,651 | A | 8/1984 | Duhame |
| 4,468,787 | A | 8/1984 | Keiper, Jr. |
| 4,471,493 | A | 9/1984 | Schober |
| 4,471,593 | A | 9/1984 | Ragland |
| 4,491,774 | A | 1/1985 | Schmitz |
| 4,509,093 | A | 4/1985 | Stellberger |
| 4,529,980 | A | 7/1985 | Liotine et al. |
| 4,535,333 | A | 8/1985 | Twardowski |
| 4,566,044 | A | 1/1986 | Langdon, Jr. et al. |
| 4,574,247 | A | 3/1986 | Jacob |
| 4,578,530 | A | 3/1986 | Zeidler |
| 4,580,111 | A | 4/1986 | Swanson |
| 4,581,606 | A | 4/1986 | Mallory |
| 4,590,470 | A | 5/1986 | Koenig |
| 4,593,155 | A | 6/1986 | Hawkins |
| 4,596,898 | A | 6/1986 | Pemmaraju |
| 4,596,985 | A | 6/1986 | Bongard et al. |
| 4,599,489 | A | 7/1986 | Cargile |
| 4,602,357 | A | 7/1986 | Yang et al. |
| 4,611,198 | A | 9/1986 | Levinson et al. |
| 4,623,887 | A | 11/1986 | Welles, II |
| 4,626,848 | A | 12/1986 | Ehlers |
| 4,628,315 | A | 12/1986 | Douglas |
| 4,630,035 | A | 12/1986 | Stahl et al. |
| 4,633,247 | A | 12/1986 | Hegeler |
| 4,638,433 | A | 1/1987 | Schindler |
| 4,646,080 | A | 2/1987 | Genest et al. |
| 4,652,860 | A | 3/1987 | Weishaupt et al. |
| 4,653,076 | A | 3/1987 | Jerrim et al. |
| 4,670,746 | A | 6/1987 | Taniguchi et al. |
| 4,677,284 | A | 6/1987 | Genest |
| 4,686,529 | A | 8/1987 | Kleefeldt |
| 4,695,839 | A | 9/1987 | Barbu et al. |
| 4,703,359 | A | 10/1987 | Rumbolt et al. |
| 4,710,613 | A | 12/1987 | Shigenaga |
| 4,716,301 | A | 12/1987 | Willmott et al. |
| 4,720,860 | A | 1/1988 | Weiss |
| 4,723,121 | A | 2/1988 | Van Den et al. |
| 4,731,575 | A | 3/1988 | Sloan |
| 4,737,770 | A | 4/1988 | Brunius et al. |
| 4,740,792 | A | 4/1988 | Sagey et al. |
| 4,750,118 | A | 6/1988 | Heitschel et al. |
| 4,754,255 | A | 6/1988 | Sanders et al. |
| 4,755,792 | A | 7/1988 | Pezzolo et al. |
| 4,758,835 | A | 7/1988 | Rathmann et al. |
| 4,761,808 | A | 8/1988 | Howard |
| 4,779,090 | A | 10/1988 | Micznik et al. |
| 4,794,268 | A | 12/1988 | Nakano et al. |
| 4,794,622 | A | 12/1988 | Isaacman et al. |
| 4,796,181 | A | 1/1989 | Wiedemer |
| 4,799,061 | A | 1/1989 | Abraham et al. |
| 4,800,590 | A | 1/1989 | Vaughan |
| 4,802,114 | A | 1/1989 | Sogame |
| 4,804,938 | A | 2/1989 | Rouse et al. |
| 4,807,052 | A | 2/1989 | Amano |
| 4,808,995 | A | 2/1989 | Clark et al. |
| 4,825,200 | A | 4/1989 | Evans et al. |
| 4,825,210 | A | 4/1989 | Bachhuber et al. |
| 4,829,296 | A | 5/1989 | Clark et al. |
| 4,831,509 | A | 5/1989 | Jones et al. |
| 4,835,407 | A | 5/1989 | Kataoka et al. |
| 4,845,491 | A | 7/1989 | Fascenda et al. |
| 4,847,614 | A | 7/1989 | Keller |
| 4,850,046 | A | 7/1989 | Philippe |
| 4,855,713 | A | 8/1989 | Brunius |
| 4,856,062 | A | 8/1989 | Weiss |
| 4,856,081 | A | 8/1989 | Smith |
| 4,859,990 | A | 8/1989 | Isaacman |
| 4,870,400 | A | 9/1989 | Downs et al. |
| 4,878,052 | A | 10/1989 | Schulze |
| 4,881,148 | A | 11/1989 | Lambropoulos et al. |
| 4,885,778 | A | 12/1989 | Weiss |
| 4,888,575 | A | 12/1989 | De |
| 4,890,108 | A | 12/1989 | Drori et al. |
| 4,893,338 | A | 1/1990 | Pastor |
| 4,905,279 | A | 2/1990 | Nishio |
| 4,910,750 | A | 3/1990 | Fisher |
| 4,912,463 | A | 3/1990 | Li |
| 4,914,696 | A | 4/1990 | Dudczak et al. |
| 4,918,690 | A | 4/1990 | Markkula, Jr. et al. |
| 4,922,168 | A | 5/1990 | Waggamon et al. |
| 4,922,533 | A | 5/1990 | Philippe |
| 4,928,098 | A | 5/1990 | Dannhaeuser |
| 4,931,789 | A | 6/1990 | Pinnow |
| 4,939,792 | A | 7/1990 | Urbish et al. |

(56) References Cited

U.S. PATENT DOCUMENTS 4,942,393 A 7/1990 Waraksa et al.
4,951,029 A 8/1990 Severson
4,963,876 A 10/1990 Sanders et al.
4,979,832 A 12/1990 Ritter
4,980,913 A 12/1990 Skret
4,988,990 A 1/1991 Warrior
4,988,992 A 1/1991 Heitschel et al.
4,992,783 A 2/1991 Zdunek et al.
4,999,622 A 3/1991 Amano et al.
5,001,332 A 3/1991 Schrenk
5,021,776 A 6/1991 Anderson et al.
5,023,908 A 6/1991 Weiss
5,049,867 A 9/1991 Stouffer
5,055,701 A 10/1991 Takeuchi
5,058,161 A 10/1991 Weiss
5,060,263 A 10/1991 Bosen et al.
5,091,942 A 2/1992 Dent
5,103,221 A 4/1992 Memmola
5,107,258 A 4/1992 Soum
5,126,959 A 6/1992 Kurihara
5,136,548 A 8/1992 Claar et al.
5,144,667 A 9/1992 Pogue, Jr. et al.
5,146,067 A 9/1992 Sloan et al.
5,148,159 A 9/1992 Clark et al.
5,150,464 A 9/1992 Sidhu et al.
5,153,581 A 10/1992 Hazard
5,159,329 A 10/1992 Lindmayer et al.
5,168,520 A 12/1992 Weiss
5,193,210 A 3/1993 Nicholas et al.
5,197,061 A 3/1993 Halbert-Lassalle et al.
5,220,263 A 6/1993 Onishi et al.
5,224,163 A 6/1993 Gasser et al.
5,237,614 A 8/1993 Weiss
5,252,960 A 10/1993 Duhame
5,278,907 A 1/1994 Snyder et al.
5,280,527 A 1/1994 Gullman et al.
5,331,325 A 7/1994 Miller
5,361,062 A 11/1994 Weiss et al.
5,363,448 A 11/1994 Koopman et al.
5,365,225 A 11/1994 Bachhuber
5,367,572 A 11/1994 Weiss
5,369,706 A 11/1994 Latka
5,412,379 A 5/1995 Waraksa et al.
5,414,418 A 5/1995 Andros, Jr.
5,420,925 A 5/1995 Michaels
5,442,340 A 8/1995 Dykema
5,442,341 A 8/1995 Lambropoulos
5,444,737 A 8/1995 Cripps et al.
5,463,376 A 10/1995 Stoffer
5,471,668 A 11/1995 Soenen et al.
5,473,318 A 12/1995 Martel
5,479,512 A 12/1995 Weiss
5,485,519 A 1/1996 Weiss
5,517,187 A 5/1996 Bruwer et al.
5,528,621 A 6/1996 Heiman et al.
5,530,697 A 6/1996 Watanabe
5,554,977 A 9/1996 Jablonski et al.
RE35,364 E 10/1996 Heitschel et al.
5,563,600 A 10/1996 Miyake
5,565,812 A 10/1996 Soenen
5,566,359 A 10/1996 Corrigan
5,576,701 A 11/1996 Heitschel et al.
5,578,999 A 11/1996 Matsuzawa et al.
5,594,429 A * 1/1997 Nakahara ........... G07C 9/00182
340/5.72
5,596,317 A 1/1997 Brinkmeyer et al.
5,598,475 A 1/1997 Soenen et al.
5,600,653 A 2/1997 Chitre et al.
5,608,723 A 3/1997 Felsenstein
5,614,891 A 3/1997 Zeinstra et al.
5,635,913 A 6/1997 Willmott et al.
5,657,388 A 8/1997 Weiss
5,673,017 A 9/1997 Dery et al.
5,675,622 A * 10/1997 Hewitt ............... G07C 9/00182
377/33
5,678,213 A 10/1997 Myer
5,680,131 A 10/1997 Utz
5,686,904 A 11/1997 Bruwer
5,699,065 A 12/1997 Murray
5,719,619 A 2/1998 Hattori et al.
5,745,068 A 4/1998 Takahashi et al.
5,774,065 A 6/1998 Mabuchi et al.
5,778,348 A 7/1998 Manduley et al.
5,838,747 A 11/1998 Matsumoto
5,872,513 A 2/1999 Fitzgibbon et al.
5,872,519 A 2/1999 Issa et al.
5,898,397 A 4/1999 Murray
5,923,758 A 7/1999 Khamharn et al.
5,936,999 A 8/1999 Keskitalo
5,937,065 A 8/1999 Simon et al.
5,942,985 A 8/1999 Chin
5,949,349 A 9/1999 Farris et al.
5,969,637 A * 10/1999 Doppelt ................. H05B 47/16
49/27
6,012,144 A 1/2000 Pickett
6,037,858 A 3/2000 Seki
6,049,289 A 4/2000 Waggamon et al.
6,052,408 A 4/2000 Trompower et al.
6,070,154 A 5/2000 Tavor et al.
6,094,575 A 7/2000 Anderson et al.
6,130,602 A 10/2000 O'toole et al.
6,137,421 A 10/2000 Dykema
6,140,938 A 10/2000 Flick
6,154,544 A 11/2000 Farris et al.
6,157,719 A 12/2000 Wasilewski et al.
6,166,650 A 12/2000 Bruwer
6,175,312 B1 1/2001 Bruwer et al.
6,181,255 B1 * 1/2001 Crimmins ............. G08C 19/28
340/5.25
6,229,434 B1 5/2001 Knapp et al.
6,243,000 B1 6/2001 Tsui
6,275,519 B1 8/2001 Hendrickson
6,366,051 B1 4/2002 Nantz et al.
6,396,446 B1 5/2002 Walstra et al.
6,414,587 B1 7/2002 Fitzgibbon
6,414,986 B1 7/2002 Usui
6,456,726 B1 9/2002 Yu et al.
6,463,538 B1 10/2002 Elteto
6,496,477 B1 12/2002 Perkins et al.
6,535,544 B1 3/2003 Partyka
6,549,949 B1 4/2003 Bowman-Amuah
6,609,796 B2 8/2003 Maki et al.
6,640,244 B1 10/2003 Bowman-Amuah
6,658,328 B1 12/2003 Alrabady et al.
6,688,518 B1 2/2004 Valencia et al.
6,690,796 B1 2/2004 Farris et al.
6,697,379 B1 2/2004 Jacquet et al.
6,703,941 B1 3/2004 Blaker
6,754,266 B2 6/2004 Bahl et al.
6,778,064 B1 8/2004 Yamasaki
6,810,123 B2 10/2004 Farris et al.
6,829,357 B1 12/2004 Alrabady et al.
6,842,106 B2 1/2005 Hughes et al.
6,850,910 B1 2/2005 Yu et al.
6,861,942 B1 3/2005 Knapp et al.
6,917,801 B2 7/2005 Witte et al.
6,930,983 B2 8/2005 Perkins et al.
6,956,460 B2 10/2005 Tsui
6,963,270 B1 11/2005 Gallagher et al.
6,963,561 B1 11/2005 Lahat
6,978,126 B1 12/2005 Blaker et al.
6,980,518 B1 12/2005 Sun et al.
6,980,655 B2 12/2005 Farris et al.
6,988,977 B2 1/2006 Webber et al.
6,998,977 B2 2/2006 Gregori et al.
7,002,490 B2 2/2006 Lablans
7,039,397 B2 5/2006 Chuey
7,039,809 B1 5/2006 Wankmueller
7,042,363 B2 5/2006 Katrak et al.
7,050,479 B1 5/2006 Kim
7,050,794 B2 5/2006 Chuey et al.
7,057,494 B2 6/2006 Fitzgibbon
7,057,547 B2 6/2006 Olmsted et al.
7,068,181 B2 6/2006 Chuey

(56) References Cited

U.S. PATENT DOCUMENTS 7,071,850 B1 7/2006 Fitzgibbon et al.
7,088,218 B2 8/2006 Chuey
7,088,265 B2 8/2006 Tsui et al.
7,088,706 B2 8/2006 Zhang et al.
7,139,398 B2 11/2006 Candelore et al.
7,161,466 B2 1/2007 Chuey
7,205,908 B2 4/2007 Tsui et al.
7,221,256 B2 5/2007 Skekloff et al.
7,257,426 B1 8/2007 Witkowski et al.
7,266,344 B2 * 9/2007 Rodriguez .......... H04L 12/2803
455/343.1
7,289,014 B2 10/2007 Mullet et al.
7,290,886 B2 11/2007 Cheng et al.
7,298,721 B2 11/2007 Atarashi et al.
7,301,900 B1 11/2007 Laksono
7,332,999 B2 2/2008 Fitzgibbon
7,333,615 B1 2/2008 Jarboe et al.
7,336,787 B2 2/2008 Unger et al.
7,346,163 B2 3/2008 Pedlow, Jr. et al.
7,346,374 B2 3/2008 Witkowski et al.
7,349,722 B2 3/2008 Witkowski et al.
7,353,499 B2 4/2008 De Jong
7,406,553 B2 7/2008 Edirisooriya et al.
7,412,056 B2 8/2008 Farris et al.
7,415,618 B2 8/2008 De Jong
7,429,898 B2 9/2008 Akiyama et al.
7,447,498 B2 11/2008 Chuey et al.
7,469,129 B2 12/2008 Blaker et al.
7,489,922 B2 2/2009 Chuey
7,492,898 B2 2/2009 Farris et al.
7,492,905 B2 2/2009 Fitzgibbon
7,493,140 B2 2/2009 Michmerhuizen et al.
7,516,325 B2 4/2009 Willey
7,532,965 B2 5/2009 Robillard et al.
7,535,926 B1 5/2009 Deshpande et al.
7,545,942 B2 6/2009 Cohen et al.
7,548,153 B2 6/2009 Gravelle et al.
7,561,075 B2 7/2009 Fitzgibbon et al.
7,564,827 B2 7/2009 Das et al.
7,598,855 B2 10/2009 Scalisi et al.
7,623,663 B2 11/2009 Farris et al.
7,668,125 B2 2/2010 Kadous
7,741,951 B2 6/2010 Fitzgibbon
7,742,501 B2 6/2010 Williams et al.
7,757,021 B2 7/2010 Wenzel
7,764,613 B2 7/2010 Miyake et al.
7,786,843 B2 8/2010 Witkowski
7,812,739 B2 10/2010 Chuey
7,839,263 B2 11/2010 Shearer
7,839,851 B2 11/2010 Kozat
7,855,633 B2 12/2010 Chuey
7,864,070 B2 1/2011 Witkowski et al.
7,889,050 B2 2/2011 Witkowski
7,911,358 B2 3/2011 Bos et al.
7,920,601 B2 4/2011 Andrus et al.
7,970,446 B2 6/2011 Witkowski et al.
7,973,678 B2 7/2011 Petricoin, Jr. et al.
7,979,173 B2 7/2011 Breed
7,999,656 B2 8/2011 Fisher
8,000,667 B2 8/2011 Witkowski et al.
8,014,377 B2 9/2011 Zhang et al.
8,031,047 B2 10/2011 Skekloff et al.
8,049,595 B2 11/2011 Olson et al.
8,103,655 B2 1/2012 Srinivasan et al.
8,111,179 B2 2/2012 Turnbull et al.
8,130,079 B2 3/2012 Mcquaide, Jr. et al.
8,138,883 B2 3/2012 Shearer
8,174,357 B2 5/2012 Geerlings et al.
8,194,856 B2 6/2012 Farris et al.
8,200,214 B2 6/2012 Chutorash et al.
8,207,818 B2 6/2012 Keller, Jr.
8,208,888 B2 6/2012 Chutorash et al.
8,209,550 B2 6/2012 Gehrmann et al.
8,225,094 B2 7/2012 Willey et al.
8,233,625 B2 7/2012 Farris et al.
8,253,528 B2 8/2012 Blaker
8,264,333 B2 9/2012 Blaker et al.
8,266,442 B2 9/2012 Burke et al.
8,276,185 B2 9/2012 Messina et al.
8,284,021 B2 10/2012 Farris et al.
8,290,465 B2 10/2012 Ryu et al.
8,311,490 B2 11/2012 Witkowski et al.
8,330,569 B2 12/2012 Blaker et al.
8,384,513 B2 2/2013 Witkowski
8,384,580 B2 2/2013 Witkowski et al.
8,416,054 B2 4/2013 Fitzgibbon
8,422,667 B2 4/2013 Fitzgibbon et al.
8,452,267 B2 5/2013 Friman
8,463,540 B2 6/2013 Hannah et al.
8,494,547 B2 7/2013 Nigon
8,531,266 B2 9/2013 Shearer et al.
8,536,977 B2 9/2013 Fitzgibbon
8,544,523 B2 10/2013 Mays
8,581,695 B2 11/2013 Carlson et al.
8,615,562 B1 12/2013 Huang et al.
8,633,797 B2 1/2014 Farris et al.
8,634,777 B2 1/2014 Ekbatani et al.
8,634,888 B2 1/2014 Witkowski et al.
8,643,465 B2 2/2014 Fitzgibbon
8,645,708 B2 2/2014 Labaton
8,661,256 B2 2/2014 Willey
8,699,704 B2 4/2014 Liu et al.
8,760,267 B2 6/2014 Bos et al.
8,787,823 B2 7/2014 Justice et al.
8,830,925 B2 9/2014 Kim et al.
8,836,469 B2 9/2014 Fitzgibbon et al.
8,837,608 B2 9/2014 Witkowski
8,843,066 B2 9/2014 Chutorash et al.
8,878,646 B2 11/2014 Chutorash et al.
8,918,244 B2 12/2014 Brzezinski et al.
8,981,898 B2 3/2015 Sims et al.
9,007,168 B2 4/2015 Bos et al.
9,024,801 B2 5/2015 Witkowski et al.
9,082,293 B2 7/2015 Kraimer et al.
9,122,254 B2 9/2015 Cate et al.
9,124,424 B2 9/2015 Aldis
9,142,064 B2 9/2015 Muetzel et al.
9,160,408 B2 10/2015 Krohne et al.
9,189,952 B2 11/2015 Chutorash et al.
9,229,905 B1 1/2016 Penilla et al.
9,230,378 B2 1/2016 Chutorash et al.
9,264,085 B2 2/2016 Pilat et al.
9,280,704 B2 3/2016 Lei et al.
9,317,983 B2 4/2016 Ricci
9,318,017 B2 4/2016 Witkowski et al.
9,324,230 B2 4/2016 Chutorash et al.
9,336,637 B2 5/2016 Neil et al.
9,367,978 B2 6/2016 Sullivan
9,370,041 B2 6/2016 Witkowski et al.
9,396,376 B1 7/2016 Narayanaswami
9,396,598 B2 7/2016 Daniel-Wayman et al.
9,413,453 B2 8/2016 Sugitani et al.
9,418,326 B1 8/2016 Narayanaswami
9,430,939 B2 8/2016 Shearer et al.
9,443,422 B2 9/2016 Pilat et al.
9,449,449 B2 9/2016 Evans et al.
9,539,930 B2 1/2017 Geerlings et al.
9,552,723 B2 1/2017 Witkowski et al.
9,576,408 B2 2/2017 Hendricks et al.
9,614,565 B2 4/2017 Pilat et al.
9,620,005 B2 4/2017 Geerlings et al.
9,640,005 B2 5/2017 Geerlings et al.
9,652,907 B2 5/2017 Geerlings et al.
9,652,978 B2 5/2017 Wright et al.
9,679,471 B2 6/2017 Geerlings et al.
9,691,271 B2 6/2017 Geerlings et al.
9,711,039 B2 7/2017 Shearer
9,715,772 B2 7/2017 Bauer et al.
9,715,825 B2 7/2017 Geerlings et al.
9,791,861 B2 10/2017 Keohane et al.
9,811,085 B1 11/2017 Hayes et al.
9,811,958 B1 * 11/2017 Hall ...................... G06Q 10/08
9,819,498 B2 11/2017 Vuyst et al.
9,836,905 B2 12/2017 Chutorash et al.

(56) References Cited

U.S. PATENT DOCUMENTS 9,836,955 B2 12/2017 Papay
9,836,956 B2 12/2017 Shearer et al.
9,858,806 B2 1/2018 Geerlings et al.
9,875,650 B2 1/2018 Witkowski et al.
9,879,466 B1 * 1/2018 Yu ........................ H04W 4/023
9,916,769 B2 3/2018 Wright et al.
9,922,548 B2 3/2018 Geerlings et al.
9,947,159 B2 4/2018 Geerlings et al.
9,965,947 B2 5/2018 Geerlings et al.
9,984,516 B2 5/2018 Geerlings et al.
10,008,109 B2 6/2018 Witkowski et al.
10,045,183 B2 8/2018 Chutorash et al.
10,062,229 B2 8/2018 Zeinstra et al.
10,096,186 B2 10/2018 Geerlings et al.
10,096,188 B2 10/2018 Geerlings et al.
10,097,680 B2 10/2018 Bauer et al.
10,127,804 B2 11/2018 Geerlings et al.
10,147,310 B2 12/2018 Geerlings et al.
10,163,337 B2 12/2018 Geerlings et al.
10,163,366 B2 12/2018 Wright et al.
10,176,708 B2 1/2019 Geerlings et al.
10,198,938 B2 2/2019 Geerlings et al.
10,217,303 B1 * 2/2019 Hall ......................... G07C 9/23
10,229,548 B2 3/2019 Daniel-Wayman et al.
10,282,977 B2 5/2019 Witkowski et al.
10,296,964 B1 * 5/2019 Rausch .............. G06Q 30/0635
10,486,648 B1 * 11/2019 Lin ...................... B60R 25/246
10,553,050 B1 2/2020 Romero
10,614,650 B2 * 4/2020 Minsley ............. G07C 9/00571
10,652,743 B2 5/2020 Fitzgibbon
10,713,869 B2 7/2020 Morris et al.
10,997,810 B2 5/2021 Atwell et al.
11,010,737 B1 * 5/2021 Hill .................... G06Q 20/3229
11,074,773 B1 7/2021 Morris
11,122,430 B2 9/2021 Fitzgibbon
11,238,075 B1 * 2/2022 Hansen ............... G06F 16/3334
11,423,717 B2 8/2022 Cate et al.
11,462,067 B2 10/2022 Atwell et al.
11,869,289 B2 1/2024 Cate et al.
2001/0023483 A1 9/2001 Kiyomoto
2002/0034303 A1 3/2002 Farris et al.
2002/0075133 A1 * 6/2002 Flick .................. G07C 9/00857 340/5.64
2002/0083178 A1 6/2002 Brothers
2002/0183008 A1 * 12/2002 Menard ............. G07C 9/00182 455/66.1
2002/0184504 A1 12/2002 Hughes
2002/0191785 A1 12/2002 Unknown
2002/0191794 A1 12/2002 Farris et al.
2003/0025793 A1 * 2/2003 McMahon ........... H04N 23/698 348/E7.086
2003/0033540 A1 * 2/2003 Fitzgibbon ......... G07C 9/00857 726/1
2003/0051155 A1 3/2003 Martin
2003/0056001 A1 3/2003 Mate et al.
2003/0070092 A1 4/2003 Hawkes et al.
2003/0072445 A1 4/2003 Kuhlman et al.
2003/0118187 A1 * 6/2003 Fitzgibbon ......... G07C 9/00182 340/5.28
2003/0141987 A1 7/2003 Hayes
2003/0147536 A1 8/2003 Andivahis et al.
2003/0177237 A1 9/2003 Stebbings
2003/0189530 A1 * 10/2003 Tsui ...................... G08C 19/28 345/48
2003/0190906 A1 * 10/2003 Winick ................. H04M 11/04 340/506
2003/0191949 A1 10/2003 Odagawa
2003/0227370 A1 12/2003 Brookbank et al.
2004/0019783 A1 1/2004 Hawkes et al.
2004/0046639 A1 3/2004 Giehler et al.
2004/0054906 A1 3/2004 Carro
2004/0081075 A1 4/2004 Tsukakoshi
2004/0174856 A1 9/2004 Brouet et al.
2004/0179485 A1 9/2004 Terrier
2004/0181569 A1 9/2004 Attar et al.
2004/0257200 A1 12/2004 Baumgardner et al.
2005/0030153 A1 * 2/2005 Mullet .................. E05F 15/668 340/5.25
2005/0046545 A1 * 3/2005 Skekloff ................ G08C 23/04 340/5.72
2005/0053022 A1 3/2005 Zettwoch
2005/0058153 A1 3/2005 Santhoff et al.
2005/0060555 A1 * 3/2005 Raghunath ............ H04L 9/3231 713/186
2005/0101314 A1 5/2005 Levi
2005/0151667 A1 7/2005 Hetzel et al.
2005/0174242 A1 8/2005 Cohen
2005/0285719 A1 12/2005 Stephens
2006/0020796 A1 1/2006 Aura et al.
2006/0046794 A1 3/2006 Scherschel et al.
2006/0083187 A1 4/2006 Dekel
2006/0097843 A1 * 5/2006 Libin .................. H04L 63/0846 455/420
2006/0103503 A1 5/2006 Rodriguez
2006/0109978 A1 5/2006 Farris et al.
2006/0164208 A1 * 7/2006 Schaffzin ........... G07C 9/00182 340/686.2
2006/0176171 A1 8/2006 Fitzgibbon
2006/0224512 A1 * 10/2006 Kurakata ........... G07C 9/00912 705/50
2006/0232377 A1 10/2006 Witkowski
2007/0005806 A1 1/2007 Fitzgibbon et al.
2007/0006319 A1 1/2007 Fitzgibbon et al.
2007/0018861 A1 1/2007 Fitzgibbon et al.
2007/0058811 A1 3/2007 Fitzgibbon et al.
2007/0167138 A1 * 7/2007 Bauman ............. G07C 9/00309 340/5.71
2007/0245147 A1 10/2007 Okeya
2008/0194291 A1 * 8/2008 Martin .................. B60R 25/243 455/556.1
2008/0224886 A1 * 9/2008 Rodriguez ......... G07C 9/00182 340/13.28
2008/0229400 A1 9/2008 Burke et al.
2008/0291047 A1 11/2008 Summerford et al.
2008/0297370 A1 12/2008 Farris et al.
2008/0303630 A1 12/2008 Martinez
2009/0016530 A1 1/2009 Farris et al.
2009/0021348 A1 1/2009 Farris et al.
2009/0096621 A1 4/2009 Ferlitsch
2009/0176451 A1 7/2009 Yang et al.
2009/0313095 A1 12/2009 Hurpin
2009/0315672 A1 * 12/2009 Nantz .................... G08C 17/02 340/5.21
2010/0029261 A1 2/2010 Mikkelsen et al.
2010/0060413 A1 3/2010 Fitzgibbon et al.
2010/0112979 A1 5/2010 Chen et al.
2010/0125509 A1 5/2010 Kranzley et al.
2010/0125516 A1 5/2010 Wankmueller et al.
2010/0159846 A1 6/2010 Witkowski et al.
2010/0199092 A1 8/2010 Andrus et al.
2010/0211779 A1 8/2010 Sundaram
2010/0297941 A1 * 11/2010 Doan ..................... G08C 17/02 455/41.2
2011/0037574 A1 2/2011 Pratt et al.
2011/0051927 A1 3/2011 Murray et al.
2011/0205014 A1 8/2011 Fitzgibbon
2011/0218965 A1 9/2011 Lee et al.
2011/0225451 A1 9/2011 Leggette et al.
2011/0227698 A1 9/2011 Witkowski et al.
2011/0273268 A1 * 11/2011 Bassali .............. G07C 9/00174 340/5.64
2011/0287757 A1 11/2011 Nykoluk et al.
2011/0296185 A1 12/2011 Kamarthy et al.
2011/0316668 A1 12/2011 Laird et al.
2011/0316688 A1 12/2011 Ranjan et al.
2011/0317835 A1 12/2011 Laird et al.
2011/0320803 A1 12/2011 Hampel et al.
2012/0054493 A1 3/2012 Bradley
2012/0133841 A1 5/2012 Vanderhoff et al.
2012/0191770 A1 7/2012 Perlmutter et al.
2012/0254960 A1 10/2012 Lortz et al.
2012/0297681 A1 11/2012 Krupke et al.

(56) References Cited

U.S. PATENT DOCUMENTS

2013/0017812 A1* 1/2013 Foster ................ H04L 12/2825 340/5.7
2013/0063243 A1 3/2013 Witkowski et al.
2013/0088326 A1* 4/2013 Bassali .................. E05F 15/77 340/5.64
2013/0129358 A1* 5/2013 Jung .................... H04W 12/50 398/115
2013/0147600 A1 6/2013 Murray
2013/0170639 A1 7/2013 Fitzgibbon et al.
2013/0268333 A1 10/2013 Ovick et al.
2013/0272520 A1 10/2013 Noda et al.
2013/0304863 A1 11/2013 Reber
2014/0125499 A1 5/2014 Cate et al.
2014/0137096 A1* 5/2014 Ueda ........................ G06F 8/65 717/171
2014/0169247 A1 6/2014 Jafarian et al.
2014/0245284 A1 8/2014 Alrabady et al.
2014/0266589 A1* 9/2014 Wilder .............. G07C 9/00817 340/5.64
2014/0282929 A1 9/2014 Tse
2014/0289528 A1 9/2014 Baghdasaryan et al.
2014/0327690 A1 11/2014 Mcguire et al.
2014/0361866 A1* 12/2014 Evans .................. H04L 63/102 340/4.32
2015/0002262 A1 1/2015 Geerlings et al.
2015/0022436 A1 1/2015 Cho et al.
2015/0084750 A1 3/2015 Fitzgibbon
2015/0116082 A1 4/2015 Cregg et al.
2015/0139423 A1 5/2015 Hildebrandt et al.
2015/0161832 A1 6/2015 Esselink et al.
2015/0187019 A1 7/2015 Fernandes et al.
2015/0222436 A1* 8/2015 Morten ............. G07C 9/00571 713/176
2015/0222517 A1 8/2015 Mclaughlin et al.
2015/0235172 A1* 8/2015 Hall ....................... H04W 4/12 705/333
2015/0235173 A1 8/2015 Hall et al.
2015/0235493 A1* 8/2015 Hall ........................ G07C 9/28 340/5.71
2015/0235495 A1* 8/2015 Hall .................. G07C 9/00896 340/5.51
2015/0261521 A1 9/2015 Choi et al.
2015/0310737 A1 10/2015 Simanowski et al.
2015/0310765 A1 10/2015 Wright et al.
2015/0334188 A1* 11/2015 Chiba .................... H04W 4/08 709/204
2015/0358814 A1 12/2015 Roberts et al.
2016/0009188 A1 1/2016 Yokoyama et al.
2016/0020813 A1 1/2016 Pilat et al.
2016/0021140 A1 1/2016 Fitzgibbon et al.
2016/0043762 A1 2/2016 Turnbull et al.
2016/0101736 A1 4/2016 Geerlings et al.
2016/0104374 A1 4/2016 Ypma et al.
2016/0125357 A1* 5/2016 Hall ....................... H04W 4/80 705/337
2016/0145903 A1* 5/2016 Taylor .................... B60L 55/00 701/2
2016/0196706 A1 7/2016 Tehranchi et al.
2016/0198391 A1 7/2016 Orthmann et al.
2016/0203721 A1 7/2016 Wright et al.
2016/0258202 A1* 9/2016 Scalisi .............. G07C 9/00857
2016/0261572 A1 9/2016 Liu et al.
2016/0300415 A1* 10/2016 Deneen .................. E05F 15/77
2016/0302289 A1* 10/2016 Nishioka ............... G08C 17/02
2016/0359629 A1 12/2016 Nadathur et al.
2017/0061110 A1 3/2017 Wright et al.
2017/0079082 A1 3/2017 Papay
2017/0113619 A1 4/2017 Boehm et al.
2017/0140643 A1 5/2017 Puppo et al.
2017/0225526 A1 8/2017 Tomakidi et al.
2017/0230509 A1* 8/2017 Lablans ............. H04J 13/0033
2017/0256160 A1* 9/2017 Zhang ................... G08C 17/02
2017/0314981 A1* 11/2017 Flockenhaus .......... H04W 4/02
2017/0316628 A1 11/2017 Farber et al.
2017/0320464 A1 11/2017 Schultz
2017/0323498 A1 11/2017 Bauer et al.
2017/0352286 A1 12/2017 Witkowski et al.
2017/0364719 A1 12/2017 Boehm et al.
2017/0372574 A1 12/2017 Linsky
2018/0052860 A1 2/2018 Hayes et al.
2018/0053237 A1 2/2018 Hayes et al.
2018/0118045 A1 5/2018 Gruzen et al.
2018/0123806 A1 5/2018 Vuyst et al.
2018/0184376 A1 6/2018 Geerlings
2018/0225959 A1 8/2018 Witkowski et al.
2018/0232981 A1 8/2018 Geerlings et al.
2018/0234531 A1* 8/2018 Ekkel ...................... G08B 1/08
2018/0234843 A1 8/2018 Smyth et al.
2018/0245559 A1 8/2018 Kang et al.
2018/0246515 A1 8/2018 Iwama et al.
2018/0276613 A1* 9/2018 Hall ........................ G07C 9/21
2018/0285814 A1* 10/2018 Hall .................. G07C 9/00571
2018/0357847 A1* 12/2018 Shinar ..................... G07C 9/21
2018/0367419 A1* 12/2018 Hall ...................... G06Q 10/08
2019/0082149 A1 3/2019 Correnti et al.
2019/0085615 A1 3/2019 Cate et al.
2019/0102962 A1* 4/2019 Miller ............... G07C 9/00309
2019/0108391 A1* 4/2019 Matsuzawa ........... G06V 40/25
2019/0200225 A1 6/2019 Fitzgibbon
2019/0208024 A1 7/2019 Jablonski
2019/0228603 A1* 7/2019 Fowler .............. G07C 9/00174
2019/0244448 A1* 8/2019 Alamin ............. G07C 9/00896
2019/0248330 A1* 8/2019 Asano ..................... G07C 9/00
2019/0342702 A1* 11/2019 Shinar ................... G06Q 10/08
2019/0346095 A1* 11/2019 Brown ................. E05F 15/668
2019/0381972 A1* 12/2019 Takigawa .......... G07C 9/00309
2020/0005570 A1* 1/2020 Troia ................... H04L 9/3271
2020/0013241 A1* 1/2020 Johnson ............... B60R 25/248
2020/0027054 A1* 1/2020 Hall .................... G06Q 10/083
2020/0043270 A1 2/2020 Cate et al.
2020/0074753 A1 3/2020 Adiga et al.
2020/0208461 A1* 7/2020 Virgin .................... E05F 15/72
2020/0236552 A1 7/2020 Fitzgibbon
2020/0364961 A1 11/2020 Atwell et al.
2021/0029237 A1* 1/2021 Borjesson ........... H04M 11/025
2021/0248852 A1 8/2021 Atwell et al.
2021/0281405 A1 9/2021 Fitzgibbon et al.
2021/0358239 A1* 11/2021 Key ........................ H04B 5/77
2021/0385651 A1 12/2021 Fitzgibbon
2022/0130192 A1* 4/2022 Shinar .................... H04L 67/12
2023/0157218 A1* 5/2023 Adams ................. G01J 1/4204 315/192
2024/0206406 A1* 6/2024 Sibitzky .................. A01G 9/20

FOREIGN PATENT DOCUMENTS

AU 2006200340 A1 8/2006
AU 2008202369 A1 1/2009
AU 2011202656 A1 1/2012
AU 2011218848 A1 9/2012
AU 2007203558 B 5/2014
CA 2087722 C 7/1998
CA 2193846 C 2/2004
CA 2551295 A1 12/2006
CA 2926281 A1 2/2008
CA 2177410 C 4/2008
CA 2443452 C 7/2008
CA 2684658 A1 10/2008
CA 2708000 A1 12/2010
CA 2456680 C 2/2011
CA 2742018 A1 12/2011
CA 2565505 C 9/2012
CA 2631076 C 9/2013
CA 2790940 C 6/2014
CA 2596188 C 7/2016
CN 101399825 A 4/2009
DE 3234538 A1 3/1984
DE 3234539 A1 3/1984
DE 3244049 A1 9/1984
DE 3309802 A1 9/1984
DE 3320721 A1 12/1984
DE 3332721 A1 3/1985
DE 3407436 A1 8/1985

(56) References Cited

FOREIGN PATENT DOCUMENTS

| | | | |
|---|---|---|---|
| DE | 3407469 | A1 | 9/1985 |
| DE | 3532156 | A1 | 3/1987 |
| DE | 3636822 | C1 | 10/1987 |
| DE | 4204463 | A1 | 8/1992 |
| DE | 102006003808 | A1 | 11/2006 |
| DE | 102007036647 | A1 | 2/2008 |
| DE | 102010015104 | A1 | 10/2011 |
| EP | 0043270 | A1 | 1/1982 |
| EP | 0103790 | A2 | 3/1984 |
| EP | 0154019 | A1 | 9/1985 |
| EP | 0155378 | A1 | 9/1985 |
| EP | 0244322 | A1 | 11/1987 |
| EP | 0311112 | A2 | 4/1989 |
| EP | 0335912 | A1 | 10/1989 |
| EP | 0372285 | A1 | 6/1990 |
| EP | 0265935 | B1 | 5/1991 |
| EP | 0244332 | B1 | 7/1991 |
| EP | 0459781 | A1 | 12/1991 |
| EP | 0857842 | A2 | 8/1998 |
| EP | 0870889 | A2 | 10/1998 |
| EP | 0937845 | A1 | 8/1999 |
| EP | 1024626 | A1 | 8/2000 |
| EP | 1223700 | A1 | 7/2002 |
| EP | 1313260 | A2 | 5/2003 |
| EP | 1421728 | A1 | 5/2004 |
| EP | 1625560 | A1 | 2/2006 |
| EP | 1760985 | A2 | 3/2007 |
| EP | 0771498 | B1 | 5/2007 |
| EP | 1865656 | A1 | 12/2007 |
| EP | 2293478 | A2 | 3/2011 |
| EP | 2149103 | B1 | 12/2011 |
| EP | 2437212 | A1 | 4/2012 |
| EP | 1875333 | B1 | 1/2013 |
| EP | 2290872 | B1 | 6/2014 |
| EP | 2800403 | A1 | 11/2014 |
| FR | 2606232 | A1 | 5/1988 |
| FR | 2607544 | A1 | 6/1988 |
| FR | 2685520 | A1 | 6/1993 |
| FR | 2737373 | A1 | 1/1997 |
| GB | 218774 | A | 7/1924 |
| GB | 1156279 | A | 6/1969 |
| GB | 2023899 | A | 1/1980 |
| GB | 2051442 | A | 1/1981 |
| GB | 2099195 | A | 12/1982 |
| GB | 2118614 | A | 11/1983 |
| GB | 2131992 | A | 6/1984 |
| GB | 2133073 | A | 7/1984 |
| GB | 2184774 | A | 7/1987 |
| GB | 2254461 | A | 10/1992 |
| GB | 2265482 | A | 9/1993 |
| GB | 2288261 | A | 10/1995 |
| GB | 2430115 | A | 3/2007 |
| GB | 2440816 | A | 2/2008 |
| GB | 2453383 | A | 4/2009 |
| JP | H06205474 | A | 7/1994 |
| JP | H09322274 | A | 12/1997 |
| KR | 20050005150 | A | 1/2005 |
| KR | 20060035951 | A | 4/2006 |
| WO | 9300137 | A1 | 1/1993 |
| WO | 9301140 | A1 | 1/1993 |
| WO | 9320538 | A1 | 10/1993 |
| WO | 9400147 | A1 | 1/1994 |
| WO | 9411829 | A1 | 5/1994 |
| WO | 9418036 | A1 | 8/1994 |
| WO | 0010301 | A2 | 2/2000 |
| WO | 0010302 | A1 | 2/2000 |
| WO | 03010656 | A2 | 2/2003 |
| WO | 03079607 | A1 | 9/2003 |
| WO | 2008082482 | A2 | 7/2008 |
| WO | 2011106199 | A1 | 9/2011 |
| WO | 2019126453 | A1 | 6/2019 |
| ZA | 898225 | B | 10/1991 |

OTHER PUBLICATIONS

Office Action, dated May 12, 2023, by the USPTO, re U.S. Appl. No. 17/879,927, 8 pages.

US 7,902,994 B2, Mar. 2011, Geerlings (withdrawn)

US 10,135,479 B2, Nov. 2018, Turnbull (withdrawn)

Access Transmitters-Access Security System, pp. 1-2, Dated Jul. 16, 1997. http://www.webercreations.com/access/security.html.

About us—ParqEx, 5 pages, Wayback Machine capture dated May 5, 2018, 5 pages, retrieved from https://web.archive.org/web/20180505051951/https://www.parqex.com/about-parqex/.

Abrams, and Podell, 'Tutorial Computer and Network Security,' District of Columbia: IEEE, 1987. pp. 1075-1081.

Abramson, Norman. 'The Aloha System—Another alternative for computer communications,' pp. 281-285, University of Hawaii, 1970.

Adams, Russ, Classified, data-scrambling program for Apple II, Info-World, vol. 5, No. 3; Jan. 31, 1988.

Alexi, Werner, et al. 'RSA and Rabin Functions: Certain Parts Are as Hard as the Whole', pp. 194-209, Siam Computing, vol. 14, No. 2, Apr. 1988.

Allianz: Allianz-Zentrum for Technik Gmbh—Detailed Requirements for Fulfilling the Specification Profile for Electronically Coded OEM Immobilizers, Issue 22, (Jun. 1994 (Translation Jul. 5, 1994).

Anderson, Ross.'Searching for the Optimum Correlation Attack', pp. 137-143, Computer Laboratory, Pembroke Street, Cambridge CB2 3QG, Copyright 1995.

Arazi, Benjamin, Vehicular Implementations of Public Key Cryptographic Techniques, IEEE Transactions on Vehicular Technology, vol. 40, No. 3, Aug. 1991, 646-653.

Baran, P. Distribution Communications, vol. 9, 'Security Secrecy and Tamper-free Communications', Rand Corporation, 1964.

Barbaroux, Paul. 'Uniform Results in. Polynomial-Time Security', pp. 297-306, Advances in Cryptology—Eurocrypt 92, 1992.

Barlow, Mike, 'A Mathematical Word Block Cipher,' 12 Cryptologia 256-264 (1988).

Bellovin, S.M. 'Security Problems in the TCPIP Protocol Suite', pp. 32-49, Computer Communication Review, New Jersey, Reprinted from Computer Communication Review, vol. 19, No. 2, pp. 32-48, Apr. 1989.

Beutelspacher, Albrecht. Advances in Cryptology—Eurocrypt 87: 'Perfect and Essentially Perfect Authentication Schemes' (Extended Abstract), pp. 167-170, Federal Republic of Germany, believed to be publicly available prior to Jun. 30, 2004.

Bloch, Gilbert. Enigma Before Ultra Polish Work and The French Contribution, pp. 142-155, Cryptologia 11(3), (Jul. 1987).

Bosworth, Bruce, 'Codes, Ciphers, and Computers: An Introduction to Information Security' Hayden Book Company, Inc. 1982, pp. 30-54.

Brickell, Ernest F. and Stinson, Doug. 'Authentication Codes With Multiple Arbiters', pp. 51-55, Proceedings of Eurocrypt 88, 1988.

Bruwer, Frederick J. 'Die Toepassing Van Gekombineerde Konvolusiekodering en Modulasie op HF-Datakommunikasie,' District of Pretoria in South Africa Jul. 1998, 176 pages.

Burger, Chris R., Secure Learning RKE Systems Using KeeLoq. RTM. Encoders, TB001, 1996 Microchip Technology, Inc., 1-7.

Burmeister, Mike. A Remark on the Efficiency of Identification Schemes, pp. 493-495, Advances in Cryptology—Eurocrypt 90, (1990).

Cattermole, K.W., 'Principles of Pulse Code Modulation' Iliffe Books Ltd., 1969, pp. 30-381.

Cerf, Vinton a 'Issues in Packet-Network Interconnection', pp. 1386-1408, Proceedings of the IEEE, 66(11), Nov. 1978.

Cerf, Vinton G. and Kahn, Robert E. 'A Protocol for Packet Network Intercommunication', pp. 637-648, Transactions on Communications, vol. Com-22, No. 5, May 1974.

Charles Watts, How to Program the HiSec(TM) Remote Keyless Entry Rolling Code Generator, National Semiconductor, Oct. 1994, 1-4.

Computer Arithmetic by Henry Jacobowitz; Library of Congress Catalog Card No. 62-13396; Copyright Mar. 1962 by John F. Rider Publisher, Inc.

(56) References Cited

OTHER PUBLICATIONS

Conner, Doug, Cryptographic Techniques—Secure Your Wireless Designs, EDN (Design Feature), Jan. 18, 1996, 57-68.
Coppersmith, Don. 'Fast Evaluation of Logarithms in Fields of Characteristic Two', IT-30(4): pp. 587-594, IEEE Transactions on Information Theory, Jul. 1984.
Daniels, George, 'Pushbutton Controls for Garage Doors' Popular Science (Aug. 1959), pp. 156-160.
Davies, D.W. and Price, W.C. 'Security for Computer Networks,' John Wiley and Sons, 1984. Chapter 7, pp. 175-176.
Davies, Donald W., 'Tutorial: The Security of Data in Networks,' pp. 13-17, New York: IEEE, 1981.
Davis, Ben and De Long, Ron. Combined Remote Key Control and Immobilization System for Vehicle Security, pp. 125-132, Power Electronics in Transportation, IEEE Catalogue No. 96TH8184, (Oct. 24, 1996).
Davis, Gregory and Palmer, Morris. Self-Programming, Rolling-Code Technology Creates Nearly Unbreakable RF Security, Technological Horizons, Texas Instruments, Inc. (ECN), (Oct. 1996).
Deavours, C. A. and Reeds, James. The Enigma, Part 1, Historical Perspectives, pp. 381-391, Cryptologia, 1(4), (Oct. 1977).
Deavours, C.A. and Kruh, L. 'The Swedish HC-9 Ciphering Machine', 251-285, Cryptologia, 13(3): Jul. 1989.
Deavours, Cipher A., et al. 'Analysis of the Hebern cryptograph Using Isomorphs', pp. 246-261, Cryptology: Yesterday, Today and Tomorrow, vol. 1, No. 2, Apr. 1977.
Denning, Dorothy E. 'Cryptographic Techniques', pp. 135-154, Cryptography and Data Security, 1982. Chapter 3.
Denning, Dorothy E. A Lattice Model of Secure Information Flow, pp. 236-238, 240, 242, Communications of the ACM, vol. 19, No. 5, (May 1976).
Diffie and Hellman, Exhaustive Cryptanalysis of the NB.S Data Encryption Standard, pp. 74-84, Computer, Jun. 1977.
Diffie, Whitfield and Hellman, Martin E. New Directions in Cryptography, pp. 644-654, IEEE Transactions on Information Theory, vol. IT-22, No. 6, (Nov. 1976).
Diffie, Whitfield and Hellman, Martin E. Privacy and Authentication: An Introduction to Cryptography, pp. 397-427, Proceedings of the IEEE, vol. 67, No. 3 (Mar. 1979).
Diffie, Whitfield and Hellman, Martin, E. 'An RSA Laboratories Technical Note', Version 1.4, Revised Nov. 1, 1993.
Dijkstra, E. W. Co-Operating Sequential Processes, pp. 43-112, Programming Languages, F. Genuys. NY, believed to be publicly available prior to Jun. 30, 2004.
Dijkstra, E.W. 'Hierarchical Ordering of Sequential Processes', pp. 115-138, Acta Informatica 1: 115-138, Springer-Verlag (1971).
ElGamal, Taher. A Public Key Cryptosystem and a Signature Scheme Based on Discrete Logarithms, pp. 469-472, IEEE, Transactions on Information Theory, vol. IT-31, No. 4, (Jul. 1985).
Elgamal, Taher. A Subexponential Time Algorithm for Computing Discrete Logarithms, pp. 473-481, IEEE, Transactions on Information Theory, vol. IT-31, No. 4, (Jul. 1985).
European Patent Application No. 10 183 420.8; Communication Pursuant to Article 94(3) EPC dated May 4, 2020.
European Patent Application No. 18 833 794.3-1009; Communication Pursuant to Article 94(3) EPC.
Feistel, Horst, Notz, Wm. A. and Smith, J. Lynn. Some Cryptographic Techniques for Machine-to-Machine Data Communications, pp. 1545-1554, Proceedings of the IEEE, vol. 63, No. 11, (Nov. 1975).
Feistel, Horst. 'Cryptography and Computer Privacy', pp. 15-23, Scientific American, vol. 228, No. 5, May 1973.
Fenzl, H. and Kliner, A. Electronic Lock System: Convenient and Safe, pp. 150-153, Siemens Components XXI, No. 4, (1987).
Fischer, Elliot. Uncaging the Hagelin Cryptograph, pp. 89-92, Cryptologia, vol. 7, No. 1, (Jan. 1983).
Fragano, Maurizio. Solid State Key/Lock Security System, pp. 604-607, IEEE Transactions on Consumer Electronics, vol. CE-30, No. 4, (Nov. 1984).
G. Davis, Marcstar. TM. TRC1300 and TRC1315 Remote Control Transmitter/Receiver, Texas Instruments, Sep. 12, 1994. 1-24.
Godlewski, Ph. and Camion P. 'Manipulations and Errors, Delection and Localization,' pp. 97-106, Proceedings of Eurocrypt 88, 1988.
Gordon, Professor J., Police Scientific Development Branch, Designing Codes for Vehicle Remote Security Systems, (Oct. 1994), pp. 1-20.
Gordon, Professor J., Police Scientific Development Branch, Designing Rolling Codes for Vehicle Remote Security Systems, (Aug. 1993), pp. 1-19.
Greenlee, B.M., Requirements for Key Management Protocols in the Wholesale Financial Services Industry, p. 22 28, IEEE Communications Magazine , Sep. 1985.
Guillou, Louis C. and Quisquater, Jean-Jacques. 'A Practical Zero-Knowledge Protocol Fitted to Security Microprocessor Minimizing Both Transmission and Memory', pp. 123-128, Advances in Cryptology—Eurocrypt 88, 1988.
Guillou, Louis C. Smart Cards and Conditional Access, pp. 481-489, Proceedings of Eurocrypt, (1984).
Habermann, A. Nico, Synchronization of Communicating Processes , pp. 171 176, Communications , Mar. 1972.
Hagelin C-35/C-36 (The), (1 page) Sep. 3, 1998. http://hem.passagen.se/tan01/C035.HTML.
Haykin, Simon, "An Introduction to Analog and Digital Communications" 213, 215 (1989).
IEEE 100; The Authoritative Dictionary of IEEE Standards Terms, Seventh Edition, Published by Standards Information Network, IEEE Press, Copyright 2000.
International Search Report and Written Opinion; PCT/US2019/044358 dated Nov. 17, 2019, 14 pages.
ISO 8732: 1988(E): Banking Key Management (Wholesale) Annex D: Windows and Windows Management, Nov. 1988.
ITC Tutorial; Investigation No. 337-TA-417; (TCG024374-24434); Dated: Jul. 7, 1999.
Jones, Anita K. Protection Mechanisms and the Enforcement of Security Policies, pp. 228-251, Carnegie-Mellon University, Pittsburgh, PA, (1978).
Jueneman, R.R et al. 'Message Authentication', pp. 29-40, IEEE Communications Magazine, vol. 23, No. 9, Sep. 1985.
Kahn, Robert E. The Organization of Computer Resources Into a Packet Radio Network, pp. 177-186, National Computer Conference, (1975).
Keeloq.RTM. Code Hopping Decoder, HCS500, 1997 Microchip Technology, Inc., 1-25.
Keeloq.RTM. Code Hopping Encoder, HCS300, 1996 Microchip Technology, Inc., 1-20.
Keeloq.RTM. NTQ 105 Code Hopping Encoder, pp. 1-8, Nanoteq (Pty.) Ltd., (Jul. 1993).
Keeloq.RTM. Ntq 125D Code Hopping Decoder, pp. 1-9, Nanoteq (pty.) Ltd., (Jul. 1993).
Kent, Stephen T. A Comparison of Some Aspects of Public-Key and Conventional Cryptosystems, pp. 4.3.1-4.3.5, ICC '79 Int. Conf. on Communications, Boston, MA, (Jun. 1979).
Kent, Stephen T. Comments on 'Security Problems in the TCP/IP Protocol Suite', pp. 10-19, Computer Communication Review, vol. 19, Part 3, (Jul. 1989).
Kent, Stephen T. Encryption-Based Protection Protocols for Interactive User-Computer Communication, pp. 1-121, (May 1976). (See pp. 50-53).
Kent, Stephen T. Protocol Design Consideration for Network Security, pp. 239-259, Proc. NATO Advanced Study Institute on Interlinking of Computer Networks, (1979).
Kent, Stephen T. Security Requirements and Protocols for a Broadcast Scenario, pp. 778-786, IEEE Transactions on Communications, vol. com-29, No. 6, (Jun. 1981).
Kent, Stephen T., et al. Personal Authorization System for Access Control to the Defense Data Network, pp. 89-93, Conf. Record of Eascon 82 15.sup.th Ann Electronics & Aerospace Systems Conf., Washington, D.C. (Sep. 1982).
Konheim, A.G. Cryptography: A Primer, pp. 285-347, New York, (John Wiley, 1981).

(56) References Cited

OTHER PUBLICATIONS

Koren, Israel, "Computer Arithmetic Algorithms" Prentice Hall, 1978, pp. 1-15. Kruh, Louis. Device and Machines: The Hagelin Cryptographer, Type C-52, pp. 78-82, Cryptologia, vol. 3, No. 2, (Apr. 1979).
Kruh, Louis. How to Use the German Enigma Cipher Machine: A photographic Essay, pp. 291-296, Cryptologia, vol. No. 7, No. 4 (Oct. 1983).
Kuhn, G.J., et al. A Versatile High-Speed Encryption Chip, INFOSEC '90 Symposium, Pretoria, (Mar. 16, 1990).
Kuhn. G.J. Algorithms for Self-Synchronizing Ciphers, pp. 159-164, Comsig 88, University of Pretoria, Pretoria, (1988).
Lamport, Leslie. The Synchronization of Independent Processes, pp. 15-34, Acta Informatica, vol. 7, (1976).
Linn, John and Kent, Stephen T. Electronic Mail Privacy Enhancement, pp. 40-43, American Institute of Aeronautics and Astronautics, Inc. (1986).
Lloyd, Sheelagh. Counting Functions Satisfying a Higher Order Strict Avalanche Criterion, pp. 63-74, (1990).
Marneweck, Kobus. Guidelines for KeeLoq.RTM. Secure Learning Implementation, TB007, pp. 1-5, 1987 Microchip Technology, Inc.
Massey, James L. The Difficulty with Difficulty, pp. 1-4, Jul. 17, 1996. http://www.iacr.org/conferences/ec96/massey/html/framemassey.html.
McIvor, Robert. Smart Cards, pp. 152-159, Scientific American, vol. 253, No. 5, (Nov. 1985).
Meier, Willi. Fast Correlations Attacks on Stream Ciphers (Extended Abstract), pp. 301-314, Eurocrypt 88, IEEE, (1988).
Meyer, Carl H. and Matyas Stephen H. Cryptography: A New Dimension in Computer Data Security, pp. 237-249 (1982).
Michener, J.R. The 'Generalized Rotor' Cryptographic Operator and Some of Its Applications, pp. 97-113, Cryptologia, vol. 9, No. 2, (Apr. 1985).
Microchip Technology, Inc., Enhanced Flash Microcontrollers with 10-Bit A/D and nano Watt Technology, PIC18F2525/2620/4525/4620 Data Sheet, 28/40/44-Pin, .COPYRGT.2008.
*Microchip* v. *The Chamberlain Group, Inc.*, (TCG019794-019873); Deposition of J. Fitzgibbon; Partially redacted; Dated: Jan. 7, 1999.
*Microchip* v. *The Chamberlain Group, Inc.*, (TCG019874-019918); Deposition of J. Fitzgibbon; Dated: Mar. 16, 1999.
*Microchip* v. *The Chamberlain Group, Inc.*, Civil Action No. 98-C-6138; (TCG024334-24357); Declaration of V. Thomas Rhyne; Dated: Feb. 22, 1999.
MM57HS01 HiSeC.TM. Fixed and Rolling Code Decoder, National Semiconductor, Nov. 11, 1994, 1-8.
Morris, Robert. The Hagelin Cipher Machine (M-209): Reconstruction of the Internal Settings, pp. 267-289, Cryptologia, 2(3), (Jul. 1978).
Newman, David B., Jr., et al. 'Public Key Management for Network Security', pp. 11-16, IEE Network Magazine, 1987.
Nickels, Hamilton, 'Secrets of Making and Breading Codes' Paladin Press, 1990, pp. 11-29.
Niederreiter, Harald. Keystream Sequences with a Good Linear Complexity Profile for Every Starting Point, pp. 523-532, Proceedings of Eurocrypt 89, (1989).
Nirdhar Khazanie and Yossi Matias, Growing Eddystone with Ephemeral Identifiers: A Privacy Aware & Secure Open Beacon Format; Google Developers; Thursday, Apr. 14, 2016; 6 pages.
NM95HSO1/NM95HSO2 HiSeC.TM. (High Security Code) Generator, pp. 1-19, National Semiconductor, (Jan. 1995).
Otway, Dave and Rees, Owen. Efficient and timely mutual authentication, ACM SIGOPS Operating Systems Review, vol. 21, Issue 1, Jan. 8-10, 1987.
PCT Patent Application No. PCT/US2018/066722; International Search Report and Written Opinion; dated Apr. 1, 2019.
PCT Patent Application No. PCT/US2021/065227; International Search Report and the Written Opinion; dated May 12, 2022; 12 Pages.
Peebles, Jr., Peyton Z. and Giuma, Tayeb A.; "Principles of Electrical Engineering" McGraw Hill, Inc., 1991, pp. 562-597.
Peyret, Patrice, et al. Smart Cards Provide Very High Security and Flexibility in Subscribers Management, pp. 744-752, IEE Transactions on Consumer Electronics, 36(3), (Aug. 1990).
Postel, J. ed. 'DOD Standard Transmission Control Protocol', pp. 52-133, Jan. 1980.
Postel, Jonathon B., et al. The ARPA Internet Protocol, pp. 261-271, (1981).
Reed, David P. and Kanodia, Rajendra K. Synchronization with Eventcounts and Sequencers, pp. 115-123, Communications of the ACM, vol. 22, No. 2, (Feb. 1979).
Reynolds, J. and Postel, J. Official ARPA-Internet Protocols, Network Working Groups, (Apr. 1985).
Roden, Martin S., "Analog and Digital Communication Systems," Third Edition, Prentice Hall, 1979, pp. 282-460.
Ruffell, J. Battery Low Indicator, p. 15-165, Eleckton Electronics, (Mar. 1989). (See p. 59).
Saab Anti-Theft System: 'Saab's Engine Immobilizing Anti-Theft System is a Road-Block for 'Code-Grabbing' Thieves', pp. 1-2, Aug. 1996; http://www.saabusa.com/news/newsindex/alarm.html.
Savage. J.E. Some Simple Self-Synchronizing Digital Data Scramblers, pp. 449-498, The Bell System Tech. Journal, (Feb. 1967).
Seberry, J. and Pieprzyk, Cryptography—An Introduction to Computer Security, Prentice Hall of Australia, YTY Ltd, 1989, pp. 134-136.
Secure Terminal Interface Module for Smart Card Application, pp. 1488-1489, IBM: Technical Disclosure Bulletin, vol. 28, No. 4, (Sep. 1985).
Shamir, Adi. 'Embedding Cryptographic Trapdoors In Arbitrary Knapsack Systems', pp. 77-79, Information Processing Letters, 1983.
Siegenthaler, T. Decrypting a Class of Stream Ciphers Using Ciphertext Only, pp. 81-85, IEEE Transactions on Computers, vol. C-34, No. 1, (Jan. 1985).
Simmons, Gustavus, J. Message Authentication with Arbitration of Transmitter/Receiver Disputes, pp. 151-165 (1987).
Smith, J.L., et al. An Experimental Application of Cryptography to a Remotely Accessed Data System, pp. 282-297, Proceedings of the ACM, (Aug. 1972).
Smith, Jack, 'Modem Communication Circuits.' McGraw-Hill Book Company, 1986, Chapter 11, pp. 420-454.
Smith, Jack, 'Modem Communication Circuits' McGraw-Hill Book Company, 1986, Chapter 7, pp. 231-294.
Smith. J.L. The Design of Lucifer: a Cryptographic Device for Data Communications, pp. 1-65, (Apr. 15, 1971).
Soete, M. Some constructions for authentication—secrecy codes, Advances in Cryptology—Eurocrypt '88, Lecture Notes in Computer Science 303 (1988), 57-75.
Spothero, Frequently Asked Questions, Wayback Machine capture dated Jun. 30, 2017, 3 pages, retrieved from https://web.archive.org/web/20170630063148/https://spothero.com/faq/.
Steven Dawson, Keeloq.RTM. Code Hopping Decoder Using Secure Learn, AN662, 1997 Microchip Technology, Inc., 1-16.
Summary of Spothero Product, publicly available before Aug. 1, 2018.
Svigals, J. Limiting Access to Data in an Identification Card Having A Micro-Processor, pp. 580-581, IBM: Technical Disclosure Bulletin, vol. 27, No. 1B, (Jun. 1984).
Thatcham: The Motor Insurance Repair Research Centre, The British Insurance Industry's Criteria for Vehicle Security (Jan. 1993) (Lear 18968-19027), pp. 1-36.
Transaction Completion Code Based on Digital Signatures, pp. 1109-1122, IBM: Technical Disclosure Bulletin, vol. 28, No. 3, (Aug. 1985).
Turn, Rein. Privacy Transformations for Databank Systems, pp. 589-601, National Computer Conference, (1973).
Uber, Airbnb and consequences of the sharing economy: Research roundup, Harvard Kennedy School—Shorenstein Center on Media, Politics, and Public Policy, 14 pages, Jun. 3, 2016, retrieved from https://journalistsresource.org/studies/economics/business/airbnb-lyft-uber-bike-share-sharing-economy-research-roundup/.
U.S. Appl. No. 16/454,978; Notice of Allowance dated Feb. 16, 2021, 9 pages.

(56) References Cited

OTHER PUBLICATIONS

U.S. Appl. No. 16/454,978; Notice of Allowance dated Feb. 16, 2021.
U.S. Appl. No. 16/454,978, filed Jun. 27, 2019; 57 pages.
U.S. Appl. No. 16/454,978; Office Action dated May 8, 2020; 25 pages.
U.S. Appl. No. 16/454,978; Office Action dated Sep. 22, 2020; 36 pages.
U.S. Appl. No. 16/528,376; Office Action dated Feb. 17, 2021; (pp. 1-14).
U.S. Appl. No. 16/528,376; Office Action dated Aug. 18, 2020, (pp. 1-11).
U.S. Appl. No. 16/871,844; Notice of Allowance dated Feb. 23, 2021 ; (pp. 1-6).
U.S. Appl. No. 16/871,844; Notice of Allowance dated Mar. 23, 2021; (pp. 1-5).
U.S. Appl. No. 16/871,844; Notice of Allowance dated Dec. 28, 2020; 38 pages.
U.S. Appl. No. 16/871,844; Notice of Allowance dated Dec. 28, 2020; (pp. 1-10).
U.S. Appl. No. 16/528,376; Non-Final Rejection dated Jan. 19, 2022; (pp. 1-12).
U.S. Appl. No. 16/528,376; Notice of Allowance and Fees Due (PTOL-85) dated Jun. 14, 2022; (pp. 1-8).
U.S. Appl. No. 16/528,376; Notice of Allowance and Fees Due (PTOL-85) dated Jul. 6, 2022; (pp. 1-3).
U.S. Appl. No. 16/528,376; Notice of Allowance and Fees Due (PTOL-85) dated Jul. 20, 2022; (pp. 1-3).
U.S. Appl. No. 17/245,672; Notice of Allowance and Fees Due (PTOL-85) dated May 2, 2022; (pp. 1-5).
U.S. Appl. No. 17/245,672; Notice of Allowance and Fees Due (PTOL-85) dated Sep. 2, 2022; (pp. 1-2).
U.S. Appl. No. 17/405,671; Notice of Allowance and Fees Due (PTOL-85) dated Jan. 27, 2023; (pp. 1-7).
U.S. Appl. No. 16/528,376; Office Action dated Aug. 18, 2020; 34 Pages.
U.S. Appl. No. 16/843,119; Supplemental Notice of Allowability dated May 25, 2021, 2 pages.
U.S. Appl. No. 17,245,672; Office Action dated Jan. 31, 2022, 46 pages.
U.S. Appl. No. 16/843,119; Notice of Allowance dated May 11, 2021, 5 pages.
Voydock, Victor L. and Kent, Stephen T. 'Security in High-Level Network Protocols', IEEE Communications Magazine, pp. 12-25, vol. 23, No. 7, Jul. 1985.
Voydock, Victor L. and Kent, Stephen T. 'Security Mechanisms in High-Level Network Protocols', Computing Surveys, pp. 135-171, vol. 15, No. 2, Jun. 1983.
Voydock, Victor L. and Kent, Stephen T. Security Mechanisms in a Transport Layer Protocol, pp. 325-341, Computers & Security, (1985).
Watts, Charles and Harper John. How to Design a HiSec. TM. Transmitter, pp. 1-4, National Semiconductor, (Oct. 1994).
Weinstein, S.B. Smart Credit Cards: The Answer to Cashless Shopping, pp. 43-49, IEEE Spectrum, (Feb. 1984).
Weissman, C. Security Controls in the ADEPT-50 Time-Sharing System, pp. 119-133, AFIPS Full Joint Computer Conference, (1969).
Welsh, Dominic, Codes and Cryptography, pp. 7.0-7.1, (Clarendon Press, 1988).
Wolfe, James Raymond, "Secret Writing—The Craft of the Cryptographer" McGraw-Hill Book Company 1970, pp. 111-122, Chapter 10.
YouTube Video entitled "How to Set up Tesla Model 3 HOMELINK . . . Super Easy !!!! " https://www.youtube.com/watch?v=nmmy4i7FO5M; published Mar. 1, 2018.

* cited by examiner

MOVABLE BARRIER OPERATOR AND TRANSMITTER PAIRING OVER A NETWORK

CROSS-REFERENCE TO RELATED APPLICATIONS

This is a continuation of U.S. patent application Ser. No. 17/879,927, filed Aug. 3, 2022, entitled MOVABLE BARRIER OPERATOR AND TRANSMITTER PAIRING OVER A NETWORK, which is a continuation of U.S. patent application Ser. No. 16/528,376, filed Jul. 31, 2019, new U.S. Pat. No. 11,423,717, entitled MOVABLE BARRIER OPERATOR AND TRANSMITTER PAIRING OVER A NETWORK, which claims the benefit of U.S. Provisional Application No. 62/713,527, filed Aug. 1, 2018, U.S. Provisional Application No. 62/786,837, filed Dec. 31, 2018, and U.S. Provisional Application No. 62/812,642, filed Mar. 1, 2019, the disclosures of which are incorporated herein by reference in their entireties.

TECHNICAL FIELD

The present disclosure relates generally to movable barrier operators, and more specifically to the pairing of transmitters and network-enabled moveable barrier operators.

BACKGROUND

Movable barriers are known, including, but not limited to, one-piece and sectional garage doors, pivoting and sliding gates, doors and cross-arms, rolling shutters, and the like. In general, a movable barrier operator system for controlling such a movable barrier includes a movable barrier operator coupled to the corresponding movable barrier and configured to cause the barrier to move (typically between closed and opened positions).

A movable barrier operator can typically be operated by a radio frequency (RF) transmitter that is provided/associated with or otherwise accompanies the movable barrier operator. Conventionally, to pair a movable barrier operator with a transmitter, a user presses a program/learn button on the movable barrier operator and then presses a button of the transmitter to cause the transmitter to transmit a code which may be constituted by a fixed portion (e.g. transmitter identification number) and a variable portion (e.g. rolling code that changes with each actuation of the transmitter's button). The movable barrier operator then learns the transmitter relative to the code (e.g. one or both of the fixed and variable portions) that was transmitted by the transmitter such that subsequently received codes from the transmitter are recognized by the movable barrier operator to thereby cause performance of an action.

Description

Figure 1:
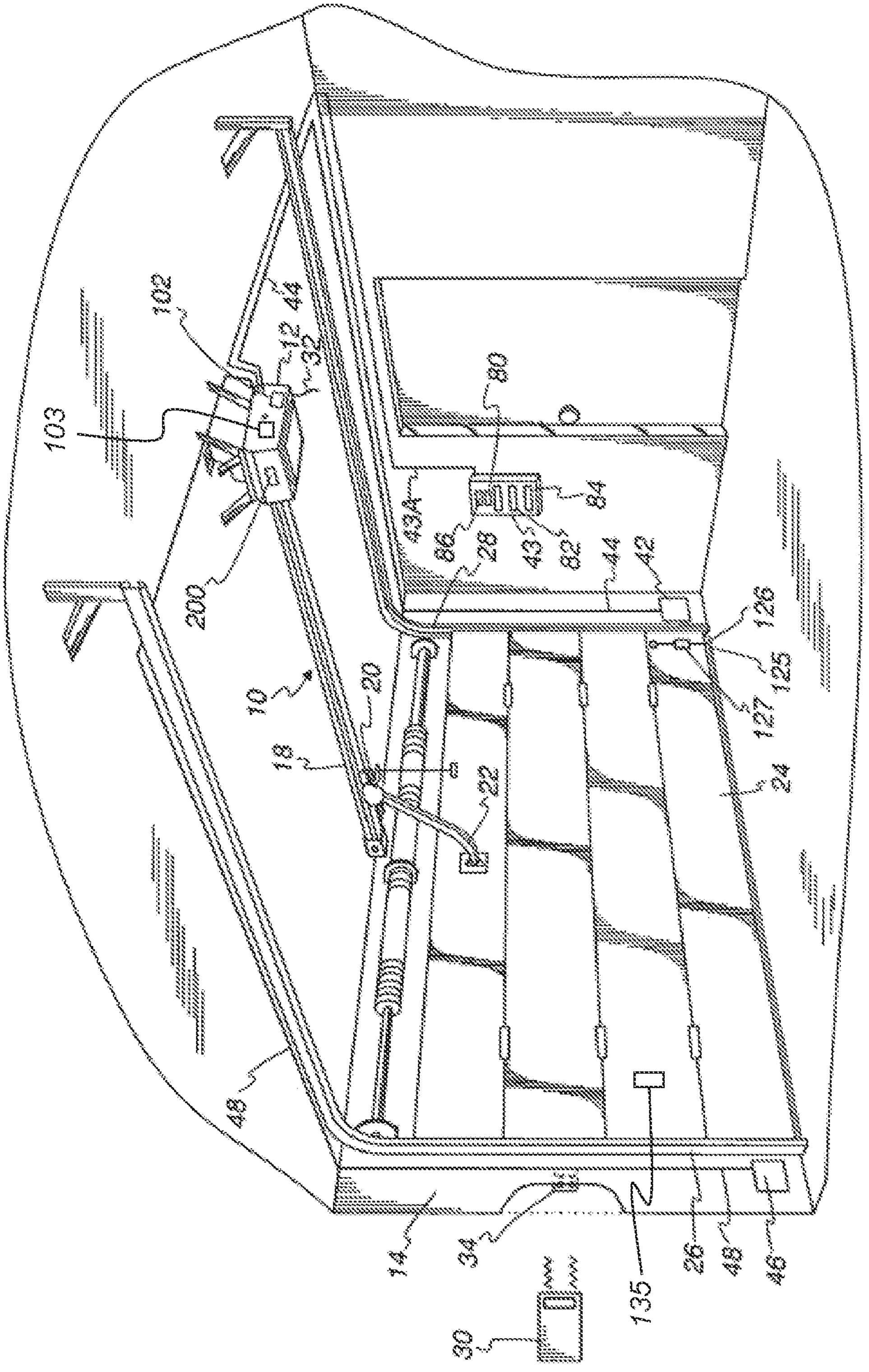
FIG. 1 is a perspective view of a garage having a garage door opener mounted therein.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments. It will be further appreciated that certain actions and/or operations may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

SUMMARY

Methods and apparatuses for pairing a movable barrier operator and a transmitter are provided. In some embodiments, a movable barrier operator apparatus is provided that includes a memory and communication circuitry configured to receive an add transmitter request including a transmitter code from a remote computer via a network. The communication circuitry is configured to receive a radio frequency control signal from an unknown transmitter, the radio frequency control signal including a fixed code of the unknown transmitter. The apparatus further includes a processor configured to store, in the memory, the transmitter code of the add transmitter request received from the remote computer. The processor is further configured to determine whether to operate a movable barrier based at least in part upon whether the fixed code of the radio frequency control signal received from the unknown transmitter corresponds to the transmitter code received from the remote computer. Because the communication circuitry receives the transmitter code from the remote computer, the processor may place the transmitter code of an unknown transmitter on a transmitter whitelist stored in the memory of the movable barrier operator apparatus. The processor may decide to operate a movable barrier in response to receiving a control signal having a fixed code corresponding to the transmitter code stored in the whitelist without requiring a user to perform a conventional learning process with the transmitter and the movable barrier operator apparatus.

In some embodiments, a method for operating a movable barrier operator apparatus is provided. The method comprises receiving an add transmitter request including a transmitter code from a remote computer via communication circuitry of the movable barrier operator apparatus. The method includes storing, with a processor of the movable barrier operator apparatus, the transmitter code of the add transmitter request in a memory of the movable barrier operator apparatus. The method includes receiving, at the communication circuitry of the movable barrier operator apparatus, a radio frequency control signal from an unknown transmitter, the radio frequency control signal including a fixed code of the unknown transmitter. The method further includes determining, with the processor, whether to operate a movable barrier based at least in part upon whether the fixed code received from the unknown transmitter corresponds to the transmitter code received from the remote computer. The method thereby permits a movable barrier operator apparatus to respond to a control signal from a transmitter even if the transmitter is unknown to the movable barrier operator apparatus.

In some embodiments, a transmitter programmer apparatus is provided. The apparatus comprises communication circuitry configured to communicate with a remote computer via a network. The communication circuitry is configured to communicate with a transmitter, the transmitter operable to transmit a radio frequency control signal to a movable barrier operator apparatus. The transmitter programmer apparatus includes a processor configured to communicate a transmitter pairing request to the remote computer via the communication circuitry, receive a transmitter fixed code associated with a movable barrier operator from the remote computer in response to the transmitter pairing request, and program, via the communication circuitry, the transmitter to transmit a modified radio frequency control signal including the transmitter fixed code to actuate the movable barrier operator apparatus.

In some embodiments, a method for transmitter programming is provided. The method comprises, at a transmitter programmer apparatus, sending a transmitter pairing request to a remote computer, receiving a transmitter fixed code associated with a movable barrier operator from the remote computer in response to the transmitter pairing request, and programing a transmitter to transmit a modified radio frequency control signal including the transmitter fixed code to actuate the movable barrier.

In some embodiments, a server system for brokering movable barrier access is provided. The server system comprises communication circuitry configured to communicate with a plurality of user devices and a plurality of movable barrier operator apparatuses, and a processor operably coupled to the communication circuitry. The processor is configured to receive a transmitter pairing request from a user device requesting to access a movable barrier operator apparatus via a transmitter, verify the transmitter pairing request, and send an add transmitter request to the movable barrier operator apparatus, the add transmitter request including a transmitter code associated with the transmitter and configured to cause the movable barrier operator apparatus to store the transmitter code in a memory of the movable barrier operator apparatus.

In some embodiments, a method for brokering movable barrier access is provided. The method comprises, at server computer, receiving, via communication circuitry of the server computer, a transmitter pairing request from a user device requesting to access a movable barrier operator apparatus via a transmitter, verifying, with a processor of the server computer, the transmitter pairing request, and sending, via the communication circuitry, an add transmitter request to the movable barrier operator apparatus, the add transmitter request including a transmitter code associated with the transmitter and configured to cause the movable barrier operator apparatus to store the transmitter code in a memory of the movable barrier operator apparatus.

DETAILED DESCRIPTION

Prior to controlling a movable barrier operator with a transmitter, a user generally needs to pair the movable barrier operator with the transmitter. One prior approach for programming a garage door operator to respond to command signals from the remote control involves a user pressing a button on the garage door opener to cause the garage door opener to enter a learn mode. A user then manipulates the remote control to cause the remote control to send a control signal including an identification portion and a code portion. The code portion may include a rolling code. Because the garage door opener received the command signal when the garage door opener was in the learn mode, the garage door opener stores the identification portion and the code portion. After the garage door opener exits the learn mode, the garage door opener will respond to command signals from the remote control because the identification portion and the code portion will be recognized by the garage door opener.

One problem with this approach is that garage door openers are often mounted to ceilings of garages. A user will typically have to get on a ladder or use an object such as, for example, a broom handle to press the learn mode button on the garage door opener. These interactions are inconvenient for a user.

This prior approach becomes even more inconvenient when a user is attempting to program a transmitter of a vehicle. In this situation, the user uses a ladder or a broom to press the learn button on the garage door opener. Then, the user may have to interact with buttons or a display of the vehicle to cause the transmitter to send one or more signals to the garage door opener. For some vehicles, the built-in transmitter rapidly transmits one signal after another with changing signal formats in an attempt to find one compatible with the garage door opener.

The garage door opener learns the first compatible signal sent by the universal transmitter of the vehicle; however, the transmitter does not know which of the signals it sent was learned. The user will then have to wait for the transmitter to cycle through the signals again slowly and wait for the signal that actuates the garage door opener. When the user observes the garage door begins to move, the user pushes a button of the transmitter or vehicle display within a window of time before the next signal is transmitted to confirm that the most recent signal sent is the signal the garage door opener has learned. If the user successfully presses the button within the time window, the transmitter will know that the most recently transmitted signal was the correct signal and will stop sending signals. If the user does not press the button within the time window, the transmitter will send the next signal and the user may have to repeat the process.

Causing a garage door opener to learn a transmitter according to this process presents many opportunities for a user to deviate from the process and be unable to program the transmitter to an opener. Further, the user may feel uncomfortable with the timing and user interactions required by the process.

Some prior systems attempt to address some of the inconvenience faced by users when attempting to cause a garage door opener to learn new a transmitter. For example, one prior vehicle-based transmitter sold under the Homelink® brand name allows a vehicle to copy a signal transmitted by a hand-held transmitter that was previously learned by the garage door opener. The transmitter adds an automotive identifier to the copied signal to indicate the signal is from the vehicle-based transmitter rather than the hand-held transmitter.

The transmitter then transmits the copied signal with the automotive identifier to the garage door opener. If the garage door opener receives the copied signal and the automotive identifier together within a fixed period of time, the garage door opener learns the transmitter.

While a user does not have to climb a ladder or use a broom handle to put the movable barrier operator into a learn mode, inconvenience may still exist because a user may need to perform particular steps which may be complex, unclear or unforgiving such that programming/learning is not successful. For example, a user may be required to take an existing transmitter already paired to the garage door and transmit the signal to the vehicle. The user must know which transmitter button to press, where to point the transmitter, when to do so and for how long the button must be pressed. Additionally, if the garage door opener has not learned a transmitter or the learned transmitter is broken or lost, the user may be stuck setting up a transmitter by the inconvenient traditional approach described above.

Systems, methods, and apparatuses for pairing a movable barrier operator with a transmitter are described herein. One example method includes, at a movable barrier operator, receiving a hashed version of a fixed code associated with a transmitter from a server computer, receiving a state change request from a transmitter, and comparing a fixed code of the state change request with the hashed version of the fixed code to determine whether to respond to the state change request and/or store the fixed code in its learn table. The movable barrier operator may perform the comparing operation by performing a hash function on the fixed code of the state change request and determine whether there is a match with the hashed version of a fixed code received from the server computer. As used herein, a hashed version of a fixed code refers to the result of performing a hash function on a transmitter fixed code. Devices in the system may agree upon a hash function such that the same fixed code would result in the same hashed version of the fixed code at each device. In some embodiments, a salt may be used with the hashing function and the devices (e.g., movable barrier operator and server computer) in the system may be similarly salted or performed relative to the same salt.

Referring now to the drawings and especially to FIG. 1, a movable barrier operator, such as a garage door opener system 10, is provided that includes a garage door opener 12 mounted within a garage 14. More specifically, the garage door opener system 10 includes a rail 18 and a trolley 20 movable along the rail 18 and having an arm 22 extending to a multiple paneled garage door 24 positioned for movement along a pair of tracks 26 and 28. The system 10 includes one or more transmitters, such as a hand-held or portable transmitter 30, adapted to communicate a status change request to the garage door opener 12 and cause the garage door opener 12 to move the garage door 24. In one embodiment, the state change request includes one or more radio frequency (RF) signals communicated between the transmitter 30 and an antenna 32 of the garage door opener 12. The transmitter 30 is generally a portable transmitter unit that travels in a vehicle and/or with a human user. The one or more transmitters may include an external control pad transmitter 34 positioned on the outside of the garage 14 having a plurality of buttons thereon that communicates via radio frequency transmission with the antenna 32 of the garage door opener 12. The one or more transmitters 30 may include, for example, a transmitter built into a dashboard or a rearview mirror of a vehicle.

An optical emitter 42 is connected via a power and signal line 44 to the garage door opener 12. An optical detector 46 is connected via a wire 48 to the garage door opener 12. The optical emitter 42 and the optical detector 46 comprise a safety sensor of a safety system for detecting an obstruction in the path of the garage door 24. In another embodiment, the optical emitter 42 and/or optical detector 46 communicate with the garage door opener 12 using wireless approaches.

The garage door opener 12 may further include communication circuitry 102 configured to connect to a network such as the Internet via a Wi-Fi router in the residence associated with the garage 14. In some embodiments, the communication circuitry 102 may broadcast a wireless signal similar to a Wi-Fi router to allow a user device (e.g. smartphone, laptop, PC) to connect to a controller 103 of the garage door opener 12 via the communication circuitry 102 to setup or configure the garage door opener 12. For example, after a user device is wirelessly connected to the garage door opener 12, the user interface of the user device may be used to select a Wi-Fi network ID and input a network password to allow the garage door opener 12 to connect to the internet via the Wi-Fi router in the residence associated with the garage 14. In some embodiments, the garage door opener 12 may provide its specifications and status information to a server computer via the communication circuitry 102. In some embodiments, the garage door opener 12 may receive operation commands such as status change requests from a user device over a network via the server computer. In some embodiments, the communication circuitry 102 may further comprise a short-range wireless transceiver such as a Bluetooth transceiver for pairing with a user device during setup and receiving configurations (e.g. Wi-Fi settings) from the user device.

The garage door 24 may have a conductive member 125 attached thereto. The conductive member 125 may be a wire, rod or the like. The conductive member 125 is enclosed and held by a holder 126. The conductive member 125 is coupled to a sensor circuit 127. The sensor circuit 127 is configured to transmit an indication of an obstruction to the garage door opener 12 upon the garage door 24 contacting the obstruction. If an obstruction is detected, the garage door opener 12 can reverse the direction of the travel of the garage door 24. The conductive member 125 may be part of a safety system also including the optical emitter 42 and the optical detector 46.

The one or more transmitters may include a wall control panel 43 connected to the garage door opener 12 via a wire or line 43A. The wall control panel 43 includes a decoder, which decodes closures of a lock switch 80, a learn switch 82 and a command switch 84. The wall control panel 43 also includes an indicator such as a light emitting diode 86 connected by a resistor to the line 43A and to ground to indicate that the wall control panel 43 is energized by the garage door opener 12. Switch closures are decoded by the decoder, which sends signals along line 43A to the controller 103. The controller 103 is coupled to an electric of the garage door opener 12. In other embodiments, analog signals may be exchanged between wall control panel 43 and garage door opener 12.

The wall control panel 43 is placed in a position such that a human operator can observe the garage door 24. In this respect, the wall control panel 43 may be in a fixed position. However, it may also be moveable as well. The wall control panel 43 may also use a wirelessly coupled connection to the garage door opener 12 instead of the line 43A.

The garage door opener system 10 may include one or more sensors to determine the status of the garage door 24. For example, the garage door opener system 10 may include a tilt sensor 135 mounted to the garage door 24 to detect whether the garage door 24 is vertical (closed) or horizontal (open). Alternatively or additionally, the one or more sensors may include a rotary encoder that detects rotation of a transmission component of the garage door opener 12 such that the controller 103 of the garage door opener 12 may keep track of the position of the garage door 24.

While a garage door is illustrated in FIG. 1, the systems and methods described herein may be implemented with other types of movable barriers such as rolling shutters, slide gates, swing gates, barrier arms, driveway gates, and the like. In some embodiments, one or more components illustrated in FIG. 1 may be omitted.

Figure 2:
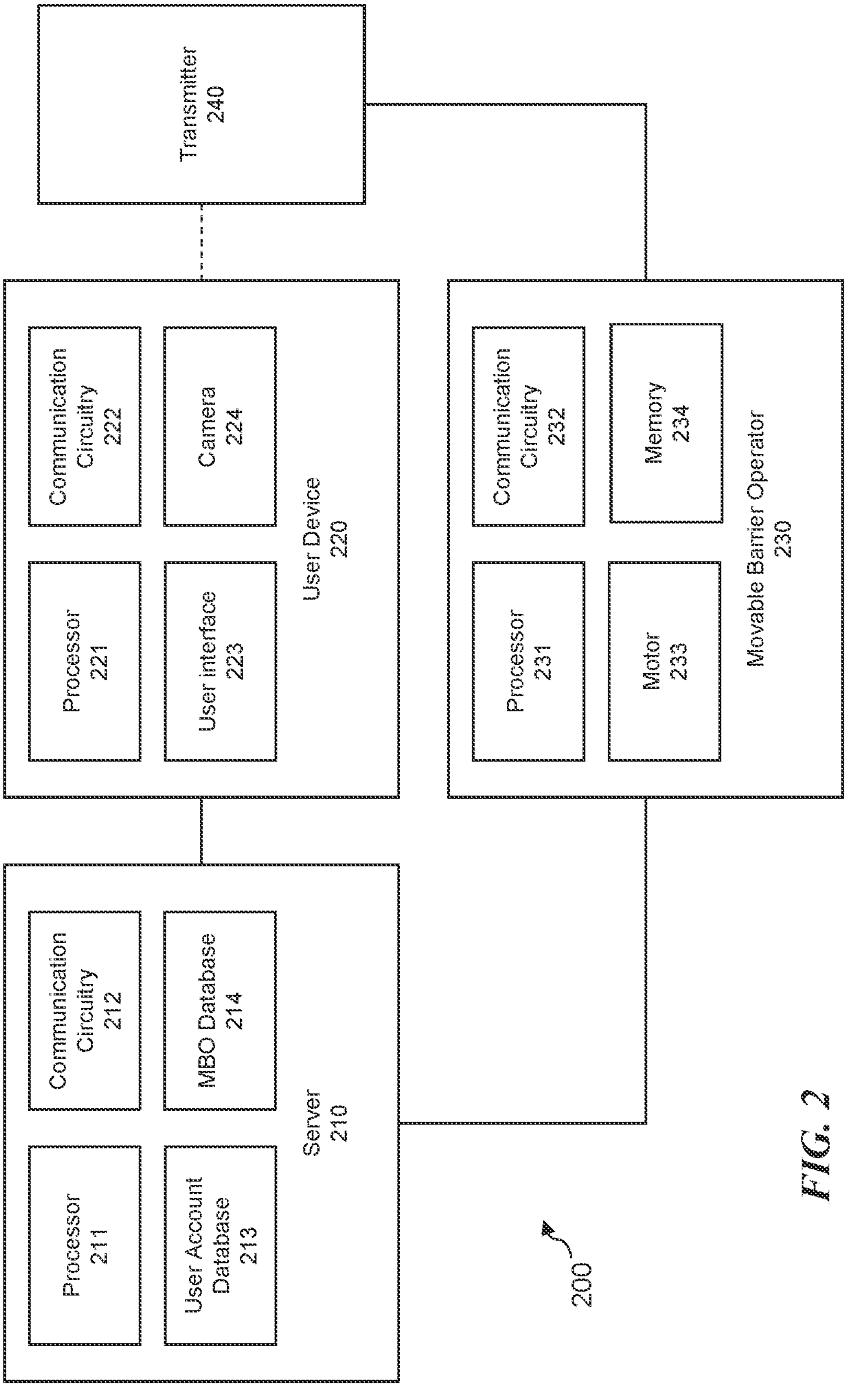
FIG. 2 is a block diagram of an example system for pairing a transmitter with a movable barrier operator.

FIG. 2 is a block diagram of an example system 200 including a server computer 210, a movable barrier operator 230, a user device 220, and a transmitter 240. The transmitter 240 is configured for actuating the movable barrier operator 230 and may be, for example, a transmitter built into a vehicle or a transmitter clipped to a visor of a vehicle. The transmitter 240 is configured to send and, optionally, receive radio frequency signals. For example, the transmitter 240 may be configured to send a command signal including a fixed code and a variable (e.g. rolling) code. The server computer 210 generally comprises one or more processor-based devices that communicate with a plurality of user devices 220 and a plurality of movable barrier operators 230 to pair transmitters 240 with movable barrier operators 230. The server computer 210 comprises a processor 211, communication circuitry 212, a user account database 213, and a movable barrier operator (MBO) database 214. The processor 211 may comprise one or more of a central processing unit (CPU), a microprocessor, a microcontroller, an application specific integrated circuit (ASIC) and the like. The processor 211 is configured to execute computer-readable instructions stored on a non-transitory computer-readable memory to provide a process for pairing transmitters 240 with movable barrier operators 230. In some embodiments, the processor 211 is configured to perform one or more operations described with reference to FIGS. 4-7 herein.

The communication circuitry 212 generally comprises circuitry configured to connect the processor 211 to a network and exchange messages with user devices 220 and movable barrier operators 230. In some embodiments, the server computer 210 may be further configured to use the communication circuitry 212 to exchange access information with servers operated by third-party service providers such as home security services, smart home systems, parking space reservation services, hospitality services, package/parcel delivery services, and the like. In some embodiments, the communication circuitry 212 may comprise one or more of a network adapter, a network port or interface, a network modem, a router, a network security device, and the like.

The user account database 213 comprises a non-transitory computer-readable memory storing user account information. Each user account record may comprise a user account identifier, log-in credential (e.g. password), associated movable barrier operator identifier(s), and/or associated transmitter(s). In some embodiments, the user account database may further store other user information such as email, phone number, physical address, associated internet protocol (IP) address, verified user devices, account preferences, linked third-party service (e.g. home security service, smart home system, parking space reservation service) accounts, and the like. In some embodiments, the user accounts database 213 may further store one or more transmitter identifiers including transmitter fixed code(s), hash(es) of the fixed code(s), and transmitter globally unique identifiers (TXGUIDs) associated with the user account. Hashing functions that may be utilized include MD5 and Secure Hashing Algorithms (e.g., SHA-1, SHA-2, SHA-256). As used herein, a transmitter code may refer to, for example, a transmitter fixed code and/or a hashed version of a transmitter fixed code. In some embodiments, user accounts database 213 may further comprise access conditions specifying the conditions (e.g. date, time) that the user or another user (e.g. visitor or guest) may be authorized to actuate a particular movable barrier operator. In some embodiments, the access conditions may be defined by a user account associated with the movable barrier operator and/or by a third-party access brokering service provider (e.g. parking space rental service, home-sharing service, etc.). In some embodiments, access conditions may comprise a number of uses restriction (e.g. singe use, once to enter and once to exit, etc.) and an access time restriction (e.g. next three days, Fridays before 10 am, etc.).

The movable barrier operator (MBO) database 214 comprises a non-transitory computer-readable memory storing information associated with movable barrier operators 230 managed by the system 200. In some embodiments, the MBO database 214 may record network addresses and/or access credentials associated with a plurality of unique MBO identifiers. In some embodiments, the MBO database 214 may include an entry for each unique MBO identifier issued by a manufacturer/supplier. In some embodiments, the MBO database 214 may further track the operations and status of an MBO over time. In some embodiments, MBOs may be associated with a user account which can configure access authorizations to the MBO. In some embodiments, the MBO database 214 may store access condition information for one or more user accounts authorized to control the MBO. In some embodiments, access authorization may be conditioned upon location, date, time, etc. In some embodiments, the user account database 213 and the MBO database 214 may be combined as a single database or data structure.

The user device 220 generally comprises an electronic device configured to allow a user (e.g. via a client application executing on the electronic device) to communicate with the server computer 210 to pair a movable barrier operator 230 and a transmitter 240 via the server computer 210. The user device 220 is a computing device and may include or be a smartphone, a laptop computer, a tablet computer, a personal computer (PC), an internet of things (IoT) device, and as some examples. Other examples of the user device 220 include in-vehicle computing devices such as an infotainment system. The user device 220 includes a processor 221, communication circuitry 222, a user interface 223, and a camera 224.

The processor 221 may comprise one or more of a central processing unit (CPU), a microprocessor, a microcontroller, an application specific integrated circuit (ASIC) and the like. The processor 221 may be configured to execute computer-readable instructions stored on a memory to provide a graphical user interface (e.g. relative to a client application executed by the processor 221) on a display of the user interface 223 and permit a user to pair a transmitter 240 with a movable barrier operator 230 via the server computer 210. In some embodiments, the graphical user interface may comprise a mobile application, a desktop application, a web-based user interface, a website, an augmented reality image, a holographic image, sound-based interactions or combinations thereof. In some embodiments, the processor 211 of the user device 220 is configured to perform one or more operations described with reference to FIGS. 4-7 herein.

The communication circuitry 222 is configured to connect the user device 220 with the server computer 210 over a network to exchange information. In some embodiments, the communication circuitry 222 may be further configured to communicate with the transmitter 240. For example, the user device 220 may receive the transmitter fixed code or a hashed version of the fixed code from the transmitter via Bluetooth, Bluetooth low energy (BLE), Near Field Communication (NFC) transmission, etc. In another example, the user device 220 may be configured to program into the transmitter 240 one or more fixed codes and/or deprogram the one or more fixed codes from the transmitter 240 via the communication circuitry 222. In some embodiments, the communication circuitry 222 may be further configured to communicate with the movable barrier operator 230. For example, a movable barrier operator 230 may broadcast a beacon signal which the user device 220 may use to identify the movable barrier operator 230 and request access to the movable barrier operator 230 at the server computer 210. The beacon signal may include, for example, a uniform resource locator (URL) that the user device may use to access a server. The communication circuitry 222 may comprise one or more of a network adapter, a network port, a cellular network (3G, 4G, 4G-LTE, 5G) interface, a Wi-Fi transceiver, a Bluetooth transceiver, a mobile data transceiver, and the like.

The user interface 223 of the user device 220 comprises one or more user input/output devices. In some embodiments, the user interface 223 comprises one or more of a display screen, a touch screen, a microphone, a speaker, one or more buttons, a keyboard, a mouse, an augmented reality display, a holographic display, and the like. The user interface 223 is generally configured to allow a user to interact with the information provided by the user device 220, such as a graphical user interface for pairing transmitters 240 and movable barrier operators 230. In some embodiments, the user interface 223 on the user device 220 may comprise an optical sensor, such as a camera 224, configured to capture images and/or videos. In some embodiments, the camera 224 may be used to scan visible, machine-readable indicium or indicia (e.g., Quick Response (QR) code, UPC barcode, etc.) and/or human-readable text associated with the transmitter 240. For example, a user may use the camera 224 to capture a barcode on the transmitter 240 and/or transmitter packaging and the processor 221 uses data decoded from the barcode to obtain a TXGUID, a hashed version of a transmitter fixed code, and/or a transmitter fixed code associated with the transmitter 240. As another example, the machine-readable indicium includes an invisible code such as an RFID signal and the communication circuitry 222 includes an RFID transceiver configured to obtain the machine-readable indicium from the transmitter 240.

The movable barrier operator 230 comprises an apparatus configured to actuate a movable barrier. The movable barrier operator 230 includes a processor 231 or logic circuitry, communication circuitry 232, a motor 233, and a memory 234. In some embodiments, the movable barrier operator 230 may include one or more other components such as those described with reference to FIG. 1 herein. In some embodiments, the movable barrier operator 230 may refer to a combination of a conventional movable barrier operator with a retrofit bridge that provides network capability to the movable barrier operator. An example of a retrofit bridge is the MyQ® Smart garage hub from The Chamberlain Group, Inc. While a motor 233 is shown as part of the movable barrier operator 230, in some embodiments, the movable barrier operator 230 may refer to a retrofit bridge without a motor. For example, a smart garage hub not directedly connected to a motor may store transmitter codes received from the server 210 and include an RF receiver. When the smart garage hub receives an RF command signal including a fixed code that is recognized by the hub but not the head unit, the hub may send a second RF signal using another fixed code previously learned by the head unit to actuate the movable barrier via the motor of the head unit.

The processor 231 comprises one or more of a central processing unit (CPU), a microprocessor, a microcontroller, an application specific integrated circuit (ASIC), logic circuitry and the like. The processor 231 is configured to execute computer-readable instructions stored on a non-transitory computer-readable memory 234 to control a movable barrier operator based on commands received from one or more transmitter such as a portable transmitter, a wall-mounted transmitter, an exterior keypad transmitter, a server, a user device, etc. In some embodiments, the processor 231 updates and accesses a learn table stored in the memory 234 of the movable barrier operator 230. The learn table includes codes of wireless transmitters authorized to actuate the movable barrier operator 230. In some embodiments, the learn table stores one or more fixed codes associated with one or more transmitters 240. In some embodiments, the learn table may further store one or more rolling codes associated with the one or more transmitters 240. The learn table may be updated through a learning/programming mode of the movable barrier operator 230. The processor 231 is further configured to communicate with the server computer 210 to receive hashes or fixed codes associated with transmitters 240 not yet stored in the learn table from the server computer 210. The memory 234 of the movable barrier operator 230 may store a table of hashes of authorized, but not yet learned, transmitters 240. When the processor 231 receives a signal from a transmitter 240 transmitting a fixed code not in the learn table, the processor 231 may hash the fixed code to obtain a hashed fixed code and compare the hashed fixed code with the stored hashes to determine whether the transmitter 240 is authorized to actuate the movable barrier operator 230. While “learn table” and “hash table” are generally used herein to describe a record of transmitter codes recognized and accepted by the movable barrier operator 230 for the operation of a movable barrier, transmitter codes may be stored in the memory 234 of movable barrier operator 230 in any data format and structure. In some embodiments, the processor 231 of the movable barrier operator 230 is configured to perform one or more operations described with reference to FIGS. 4-7 herein.

The communication circuitry 232 is configured to connect the processor 231 of the movable barrier operator 230 with the server computer 210 over a network that may be at least one of wide area and short range. In some embodiments, the communication circuitry 232 may further be configured to communicate with the user device 220. For example, the movable barrier operator 230 may broadcast a beacon signal which the user device 220 may use to identify the movable barrier operator 230 to request access. The communication circuitry 232 may comprise one or more of a network adapter, a network port or interface, a Wi-Fi transceiver, a Bluetooth transceiver, and the like. The communication circuitry 232 also includes a radio frequency (RF) receiver or transceiver for receiving radio frequency (RF) control signals from known and unknown transmitters. An unknown transmitter generally refers to, for example, a transmitter that has not been paired with (or had been unlearned e.g., previously paired with, but subsequently deleted, deprogrammed or otherwise forgotten) the movable barrier operator locally through the movable barrier operator's learn mode or to a transmitter that has been added to the memory of the movable barrier operator through an add transmitter request from a brokering server but has not yet been used to actuate the movable barrier operator. In some embodiments, the communication circuitry 232 may be integrated into the head unit (e.g. opener 12 of FIG. 1) of a garage door opener or the control box of other types of movable barrier operators. In some embodiments, the communication circuitry 232 may be a separate unit that communicates with the processor 231 of the movable barrier operator 230 via a wired or wireless (e.g. RF, Bluetooth) connection. For example, the communication circuitry 232 may comprise a retrofit bridge connected to the gate operator. The motor 233 is configured to cause a state change of the movable barrier in response to control from the processor 231.

The transmitter 240 is a wireless device configured to send a state change communication (e.g. request or command) to the movable barrier operator. In some embodiments, the transmitter 240 comprises a handheld remote control. In some embodiments, the transmitter 240 comprises a vehicle-based remote control such as a HomeLink® transmitter. In some embodiments, the state change request includes a fixed code. In some embodiments, the state change request further includes a rolling code. The transmitter 240 may comprise a control circuit, a power source (e.g. battery or wired alternating current or direct current power source), a user interface that may include one or more buttons or switches, and a radio frequency transmitter or transceiver. In some embodiments, the transmitter 240 may be associated with a unique identifier, such as a TXGUID, and/or a machine-readable code (e.g., UPC barcode, QR code, etc.) that can be decoded and used by the user device 220 and/or the server computer 210 to generate and/or retrieve a hashed version of the transmitter fixed code. The unique identifier and/or the machine-readable code may be printed on the transmitter 240 and/or the transmitter's packaging.

In some embodiments, the transmitter 240 comprises a radio frequency transmitter configured to transmit a single fixed code. For example, the transmitter 240 may comprise a conventional remote control with two or more buttons each configured to cause transmission of a single fixed code. The fixed code(s) may be stored in a memory of the control circuit of the transmitter 240. In some embodiments, the transmitter 240 may not include a network communication circuit, may not communicate with the server computer 210 directly, and/or may be configured to send, but not receive, signals from the movable barrier operator 230. In some embodiments, the transmitter 240 may comprise a conventional one-way (i.e. transmit only) garage door remote.

In some embodiments, the transmitter 240 may be programmable by the user device 220 such that the fixed code that the transmitter 240 transmits may be provided or altered based on communications with server 210 via the user device 220. For example, the user device 220 may be configured to program the fixed code of the transmitter 240 using a fixed code received from the server computer 210 to allow the transmitter 240 to control a selected movable barrier operator. In some embodiments, the transmitter 240 may further be configured to be deprogrammed by the user device 220 to remove one or more fixed codes stored on its memory. A programmable transmitter 240 may comprise a two-way transceiver such as a Bluetooth transceiver, a near-field communication (NFC) transmitter, infrared (IR) and the like for communicating directly with the user device 220. In some embodiments, a transmitter 240 may comprise programmable and nonprogrammable buttons. In some embodiments, the transmitter 240 may include two or more buttons for sending an RF signal. The user device 220 may be used to individually program each of the two or more buttons to assign different buttons to actuate different movable barrier operators.

In some embodiments, the transmitter 240 may be integrated with the user device 220 and the connection between the user device 220 and the transmitter 240 may be a wired connector. For example, the user device 220 may comprise an RF transmitter configured to send command signals to movable barrier operators 230.

While one user device 220, one movable barrier operator 230, and one transmitter 240 are shown in FIG. 2, the server computer 210 (or middleware constituted by one or more servers) may communicate with a plurality of user devices 220 and movable barrier operators 230 to pair transmitters 240 and movable barrier operators 230.

Figure 3:
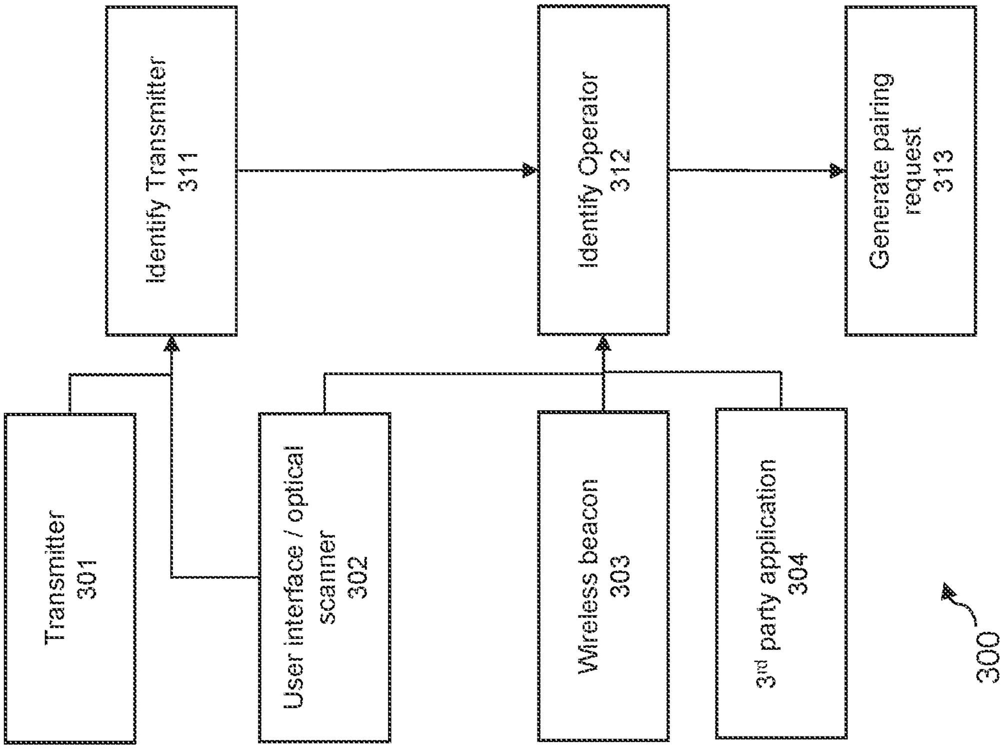
FIG. 3 is a flow diagram of an example method performed at a user device for pairing a transmitter with a movable barrier operator.

Next referring to FIG. 3 an example method 300 for pairing a transmitter with a movable barrier operator according to some embodiments is shown. In some embodiments, one or more of the operations in FIG. 3 may be performed by a user device communicating with a server. In some embodiments, one or more of the operations in FIG. 3 may be performed by the user device 220 described with reference to FIG. 2.

A system implementing the method 300 may entail a user establishing or otherwise signing up for a user account and/or logging into an existing user account managed by a server of the system. In some embodiments, the server may provide a graphical user interface on the user device to perform one or more operations in FIG. 3. For example, the server computer may include a web server that responds to requests for resources by communicating via html/xml. For example, the server computer may respond to requests include HTML CSS Javascript and and/or offer a RESTful web API that responds with JSON data. The server computer may send asynchronous push notifications that may contain machine readable metadata, in JSON format. These machine-readable pushes may contain pairing or brokering information if the channel is securely encrypted like the web and RESTful APIs.

In some embodiments, the graphical user interface may comprise a website and/or be instantiated relative to execution of a client application or a mobile application. In some embodiments, the user interface may comprise an application program interface (API) used by one or more applications. For example, a parking space rental mobile application may contain computer executable instructions to perform operations of the method 300.

In operation 311, the system implementing the method 300 identifies the transmitter 301. In some embodiments, the user device may communicate with the transmitter 301 via a wireless signal (e.g. Bluetooth Low Energy) to obtain one or more of a transmitter unique identifier (e.g., TXGUID), a transmitter fixed code, and a hashed version of the transmitter fixed code. In some embodiments, the user device may receive the transmitter's unique identifier through the user entering the transmitter's unique identifier using a user input (e.g. touch screen) of the user device in response to prompting the user. In some embodiments, the user device comprises an optical scanner or imaging device such as a camera 302 for capturing a machine-readable code (e.g., QR code, UPC barcode, etc.) or an image of the transmitter unique identifier and/or fixed code. For example, the transmitter 301 may include a QR code that provides the unique transmitter identifier, a fixed code, and/or a hashed version of the fixed code when scanned by the user device's camera and decoded. Alternatively or in addition, the operation 311 involves the user device or server providing a fixed code to the transmitter and the transmitter learning the fixed code. In some embodiments, if the transmitter includes two or more buttons each configured to cause transmission of a control signal, process 311 may further include selecting a specific button on the transmitter. For example, the user interface may prompt the user to indicate which button is being programmed during setup.

In operation 312, the system identifies the movable barrier operator to pair with the transmitter. In some embodiments, the user may enter a code or an identifier associated with a specific movable barrier operator. For example, a vacation home owner may provide a code or a digital file associated with the garage door opener of the property to a renter's user account such that the renter's transmitter may be paired with the garage door opener via the server prior to the renter's arrival. In some embodiments, the movable barrier operator may be selected from a list of movable barrier operators previously associated with the user account. For example, when a user purchases a new transmitter, the user may obtain the transmitter unique identifier using the optical scanner 302 of the user device and select the user's garage door opener using the user interface of the user device. In some embodiments, the movable barrier operator may comprise a wireless broadcast beacon 303 that transmits a code or identifier of the movable barrier operator. For example, when a renter arrives at a vacation home, the renter's user device may scan for a wireless beacon transmission to obtain an identifier associated with the garage door opener of the vacation home. In some embodiments, the movable barrier operator identifier may be provided by a third-party service or application 304. For example, a vacation home or parking space rental website or application may automatically add the movable barrier operator identifier to the user account of the renter and/or communicate the movable barrier operator identifier to the transmitter pairing application running on the renter's user device. In some embodiments, the server may receive the movable barrier operator identifier directly from the third party access brokering service provider and match the movable barrier operator identifier to the user's pairing request based on one or more of a user account, a transaction ID, a transmitter ID, a session ID, and the like.

In operation 313, the user device communicates or generates a pairing request. In some embodiments, the transmitter pairing request comprises at least one of a movable barrier operator identifier, a movable barrier access passcode, a user credential, and a transmitter identifier. In some embodiments, the pairing request includes the transmitter identifier, and the server is configured to retrieve a hash version of the transmitter's fixed code from a transmitter database of the server using the transmitter unique identifier. The transmitter database may be populated by a transmitter manufacturer that programmed the transmitters. In some embodiments, the transmitter may be previously associated with the user account and the pairing request may include a selection of a previously stored transmitter. In some embodiments, the pairing request includes the transmitter's hashed version of a fixed code, and the server is configured to forward the hashed version of the transmitter fixed code to the selected operator. In some embodiments, if the user device receives the transmitter's fixed code in operation 311, the user device may be configured to perform a hash function on the fixed code prior to sending it to the server such that the fixed code itself is not transmitted over the network. In some embodiments, the operator identifier may be included in the pairing request. In some embodiments, the operator identifier may be supplied by a third-party service. In some embodiments, the pairing request may be generated by the third-party service. For example, a user may provide user account information to the third-party access brokering service, and the brokering service provider may supply the operator identifier directly to the server and/or receive a hashed version of the transmitter fixed code to forward to the selected operator.

In some embodiments, after operation 313, the user device may receive a confirmation from the server after the pairing request is authorized. The confirmation may then be displayed to the user via the user interface of the user device. In some embodiments, the authorization may be conditioned upon time and date, and the access restrictions may also be displayed along with the confirmation. The user interface may prompt the user to enter a handle or name for the transmitter or a select button on the transmitter. The user may then use the transmitter to operate the selected movable barrier operator according to the granted access condition without further involvement of the user device and the server.

For a programmable transmitter, the user device may receive a transmitter fixed code from the remote computer in response to the transmitter pairing request and communicate with the transmitter to program the transmitter to transmit a modified control signal including the transmitter fixed code to actuate a movable barrier operator apparatus. In some embodiments, the user device may further receive an access condition associated with the transmitter fixed code and deprogram the transmitter fixed code from the transmitter based on the access condition. For example, if the access condition specifies that access is limited to a set period time, the user device may deprogram the fixed code from the transmitter after time period passes. In some embodiments, operation 311 may be omitted for a programmable transmitter. For example, the user device may communicate a transmitter pairing request to the remote computer via the communication circuitry without identifying a transmitter and select one or more transmitters to program at a later time.

Figure 4:
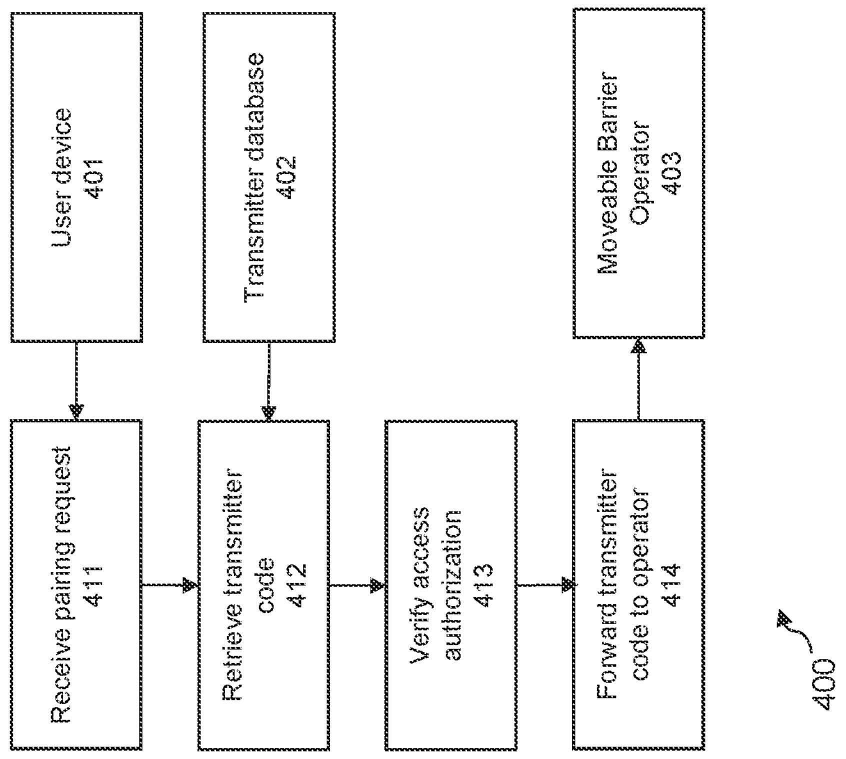
FIG. 4 is a flow diagram of an example method performed at a server computer for pairing a transmitter with a movable barrier operator.

Next referring to FIG. 4, an example method 400 for brokering movable barrier access according to some embodiments is shown. In some embodiments, one or more of the operations in FIG. 4 may be performed by a server communicating with a user device and a movable barrier operator. In some embodiments, one or more of the operations in FIG. 4 may be performed by the server computer 210 described with reference to FIG. 2.

In operation 411, the server receives a pairing request from the user device 401. In some embodiments, the pairing request may comprise a transmitter identifier, the transmitter fixed code, and/or a hashed version of the transmitter fixed code. In some embodiments, the pairing request further comprises one or more of an operator identifier and a user account credential. The pairing request may be received over a network such as the Internet. In some embodiments, the server may be configured to validate the pairing request by comparing the transmitter ID and a hashed version of a fixed code (or fixed code) in the pairing request with a hashed version of the fixed code (or fixed code) associated with the transmitter ID in a transmitter database populated by the transmitter manufacturer. In some embodiments, the server may validate that the transmitter identified in the pairing request by verifying that the transmitter had previously been associated with the requesting user account.

In operation 412, the server retrieves a transmitter code associated with the transmitter. In some embodiments, if a transmitter unique identifier is provided, the server may retrieve the fixed code or the hashed version of the fixed code from a transmitter database 402 using the transmitter identifier. In some embodiments, if a transmitter includes a plurality of buttons, the pairing request may further identify a specific button and the transmitter code may be retrieved based on the selected button. In some embodiments, each button on a transmitter device may be considered a transmitter or to be configured to control a distinct transmitter, and may be associated with a unique transmitter ID. In some embodiments, the transmitter database 402 is populated by one or more transmitter manufacturers and stores fixed codes and/or hashed version of a fixed codes associated with each unique transmitter identifier produced by the manufacturer. In some embodiments, the server may associate a user account with one or more transmitters, and the transmitter database 402 may store hashed version of the fixed codes of the one or more transmitters as previously provided by the user. For example, the user may provide the fixed code of a transmitter (e.g. operation 311 discussed above) and the server hashes the fixed code and stores the hashed version of a fixed code in the transmitter database 402. In some embodiments, the fixed code and/or the hashed version of a fixed code may be provided by the user device as part of or along with the pairing request received in operation 411. In some embodiments, the user device may directly communicate the fixed code of the transmitter to the server.

In operation 413, the server verifies access authorization for the pairing request. In some embodiments, the server may verify that the requesting user is authorized to access the selected movable barrier operator. In some embodiments, the verification may be based on at least one of a movable barrier operator access passcode, a user account associated the transmitter pairing request, and a user device location. In some embodiments, the verification may be performed by querying a movable barrier operator database and/or a user account associated with the operator. For example, the owner of the movable barrier operator may have a list of preauthorized user accounts, and the server may compare the requesting user account against the list of preauthorized user accounts. In another example, a message may be sent to the owner of the operator to request access. In some embodiments, the verification may be performed based on the information provided in the access request. For example, a movable barrier operator may have an access passcode associated with the movable barrier operator in addition to an operator identifier. Access may be granted if the pairing request includes the correct access passcode. In some embodiments, the owner may provide the requesting user a digital file (e.g. authentication cookie) that may be read by the server as proof of access authorization. In some embodiments, access authorization may further include access conditions set by the owner of the movable barrier operator and/or a third-party service. For example, certain user accounts/transmitters may be permitted to operate the movable barrier operator during a select time period (e.g. daytime, rental period) or only a predetermined number of times (e.g. one-time use, one entry and one exit, etc.).

In operation 414, if the access authorization is verified in operation 413, the server forwards the transmitter code to the movable barrier operator 403. The movable barrier operator 403 may then use the transmitter code to verify state change requests received from the transmitter. If access authorization fails, the server may return an access-denied message to the requesting user device.

In some embodiments, after operation 414, the server may further communicate with the movable barrier operator apparatus to enforce the access condition based on access condition associated with the transmitter pairing request. For example, if access is granted for a set period of time, at the expiration of the time period, the server may send a remove transmitter request to the movable barrier operator apparatus that is configured to cause the movable barrier operator apparatus to remove the transmitter code from the memory.

In some embodiments, for a programmable transmitter, operation 412 may comprise generating a new fixed code or retrieving a fixed code associated with a movable barrier operator identified in the pairing request. In such embodiments, after operation 413, the fixed code may be communicated in operation 414 to the user device 401 to program the transmitter to transmit a control signal including the fixed code. In some embodiments, operation 414 may be omitted if the movable barrier operator had previously learned the fixed code selected in step 412. In some embodiments, the fixed code may be communicated to both the user device and the movable barrier operator to broker access.

Figure 5:
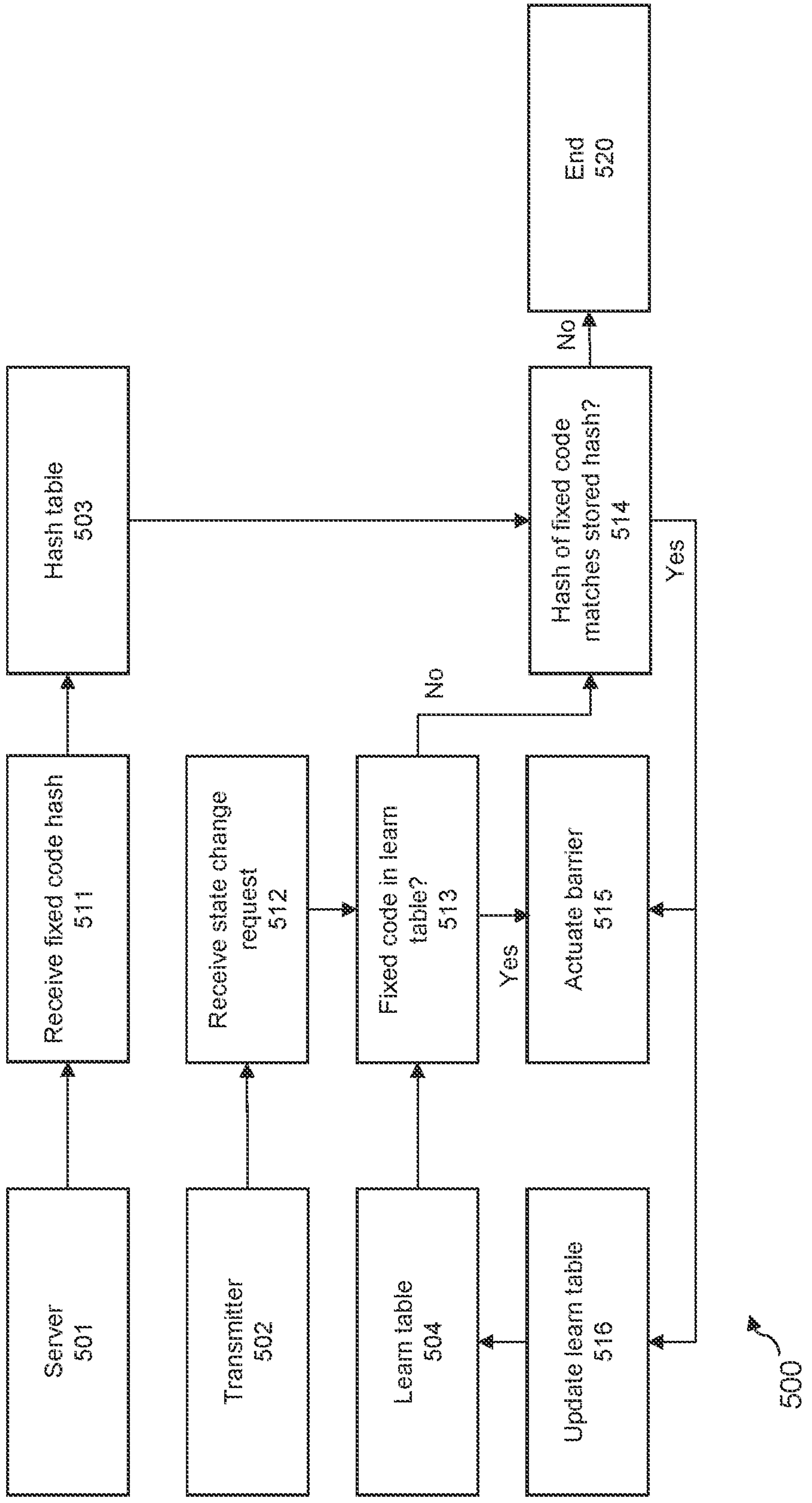
FIG. 5 is a flow diagram of an example method performed at a movable barrier operator for pairing a transmitter with the movable barrier operator.

Next referring to FIG. 5, an example method 500 for pairing a transmitter with a movable barrier operator according to some embodiments is shown. In some embodiments, one or more of the operations in FIG. 5 may be performed by a movable barrier operator communicating with a server. In some embodiments, one or more of the operations in FIG. 5 may be performed by the movable barrier operator 230 described with reference to FIG. 2.

In operation 511, the movable barrier operator receives a hashed version of a transmitter fixed code from a server 501 and stores the hashed version of the fixed code in a hash table 503. The hash table 503 generally comprises a computer-readable memory storage. In some embodiments, the hash table 503 may be implemented on the same physical device as the learn table 504. In some embodiments, the hashed versions of fixed codes in the hash table 503 may be automatically deleted if not used for a set period of time. In some embodiments, one or more hashed versions of fixed codes in the hash table 503 may have associated access conditions (e.g. date/time).

In operation 512, the movable barrier operator receives a state change request from a transmitter 502. The state change request may comprise an RF signal comprising a fixed code and/or a rolling code. In operation 513, the operator determines whether the fixed code and/or rolling code transmitted by the transmitter 502 is in the learn table 504. The learn table 504 generally stores the fixed and/or rolling code of a transmitter already paired with the movable barrier operator. If the fixed code and/or the rolling code matches a known transmitter, in operation 515, the operator actuates the movable barrier to cause a state change of the movable barrier.

If the fixed code is not associated with a known transmitter in the learn table 504, at operation 514, the movable barrier operator calculates a hash of the received fixed code and determines whether the calculated hash of the received fixed code matches a hashed version of a fixed code in the hash table 503. If the hashed version the fixed code received from the transmitter does not match any record in the hash table 503, the process terminates in operation 520 and the operator does not respond to the state change request.

If the hashed version of the received fixed code matches an entry in the hash table 503 at operation 514, the process 500 proceeds to operations 515 and/or 516. In some embodiments, the operator may also determine whether the access conditions (e.g. time of day, number of entries/exits) associated with the matching hashed version of a fixed code has been met before proceeding to operation 515 and/or operation 516. In some embodiments, the entries in the hash table 503 may be added or deleted by the server to enforce access conditions. In some embodiments, after finding a match in the hash table 503 the movable barrier operator updates the learn table in operation 516 by adding the received fixed code to the learn table to allow the transmitter to control the movable barrier operator in the future. In some embodiments, the movable barrier operator also synchronizes with the rolling code of the transmitter in operation 516 and stores the rolling code information in the learn table 504. In some embodiments, the associated hashed version of a fixed code may be removed from the hash table 503 after operation 516. In some embodiments, in operation 515, the same transmitter transmission used to update the learn table 504 may also cause the barrier to be actuated. In some embodiments, a second transmission is used to actuate the barrier.

In some embodiments, the movable barrier operator may actuate the barrier in operation 515 without updating the learn table, omitting operation 516. For example, the operator may instead be configured to query the hash table 503 each time a state change is requested by the transmitter. This approach may be taken for transmitters with access restrictions such that the records in the hash table 503 are dynamically added and removed to control access for transmitters with temporary access whereas the learn table 504 stores fixed codes of transmitters with permanent access. In some embodiments, the fixed codes of transmitters with conditional access may be stored in the hash table 503 or in a separate computer readable storage area. In some embodiments, records (fixed code and/or hashed version of a fixed code) in the learn table 504 and/or the hash table 503 may be modified based on access conditions by the operator and/or the server to enforce access authorization conditions. For example, a transmitter's hashed version of a fixed code may be removed from the hash table 503 and/or the transmitter's fixed code may be removed from the learn table 504 when the authorized access period (e.g. rental period) expires. In another example, a hashed version of a fixed code with one-time use restriction may be removed from the hash table 503 after the hashed version of a fixed code is matched with a hashed version of a fixed code associated with a transmitter transmission.

In some embodiments, the transmitter fixed code may be used in one or more operations of FIG. 5 instead of the hashed version of the fixed code. For example, a transmitter fixed code may be received in operation 511. The movable barrier operator may add the received fixed code associated with a previously unknown transmitter to the learn table 504 without going through the conventional learn mode. In such embodiments, the hash table 503 and operation 514 may be omitted. If the fixed code is not found in the learn table in operation 513, the process will directly terminate at operation 520. In some embodiments, even when fixed codes are received in procedure 511, the movable barrier operator may still separately store fixed codes with permanent access permission (e.g. added through learn mode) and fixed codes with conditional access permission (e.g. added through an access brokering server with attached access condition). For example, the head unit may store a set of fixed codes learned through the learn mode while a retrofit bridge (e.g. smart garage hub) may store transmitter codes received from the server.

Figure 6:
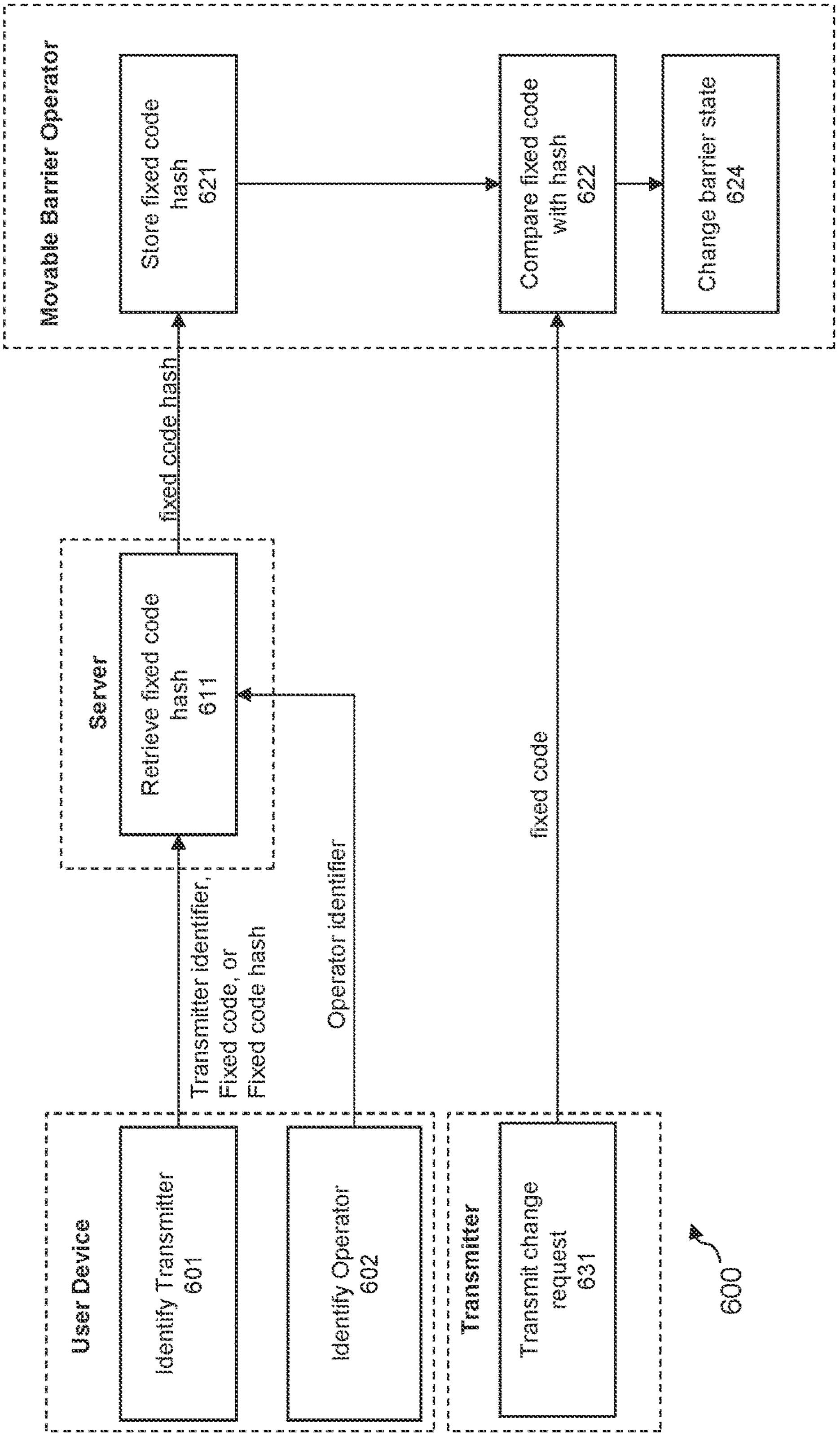
FIG. 6 is a flow diagram of another example method for pairing a transmitter with a movable barrier operator.

Now referring to FIG. 6, an example method 600 for pairing a transmitter with a movable barrier operator according to some embodiments is shown. In some embodiments, the operations in FIG. 6 may be performed using a user device, a transmitter, a server, and/or a movable barrier operator. In some embodiments, one or more operations in FIG. 6 may be performed by one or more of the user device 220, the transmitter 240, the server computer 210, and the movable barrier operator 230 described with reference to FIG. 2 herein.

In operation 601, the user device identifies the transmitter. In some embodiments, operation 601 may comprise operation 311 as shown in FIG. 3 and described previously. The user device then sends the transmitter unique identifier, transmitter fixed code, and/or hashed version of the fixed code to the server. In some embodiments, in operation 602, the user device further identifies the operator to pair with the transmitter. In some embodiments, operation 602 may comprise operation 312 as shown in FIG. 3 and described previously. The user device then sends the operator identifier to the server.

In operation 611, the server retrieves the hashed version of a transmitter fixed code from the user device and/or a transmitter database. In some embodiments, operation 611 may comprise operation 412 as shown in FIG. 4 and described previously. The server then forwards the hashed version of the fixed code to the movable barrier operator identified by the user device. In operation 621, the movable barrier operator stores the hashed version of the transmitter fixed code.

In operation 631, the transmitter transmits a state change request. In some embodiments, operation 631 may comprise a radio frequency transmission from a handheld or in-vehicle transmitter. In operation 622, the movable barrier operator receives the transmitted state change request, performs a hash function on the fixed code of the state change request from the transmitter with the stored hashed version(s) of fixed code(s) received from the server. In some embodiments, operation 622 may comprise operation 514 as shown in FIG. 5 and described previously. In operation 624, the movable barrier operator changes the barrier state if the fixed code of the transmitter matches a hashed version of a fixed code received from the server. In some embodiments, the operator may further update a learn table as described in operation 516 as shown in FIG. 5 and described previously.

Figure 7:
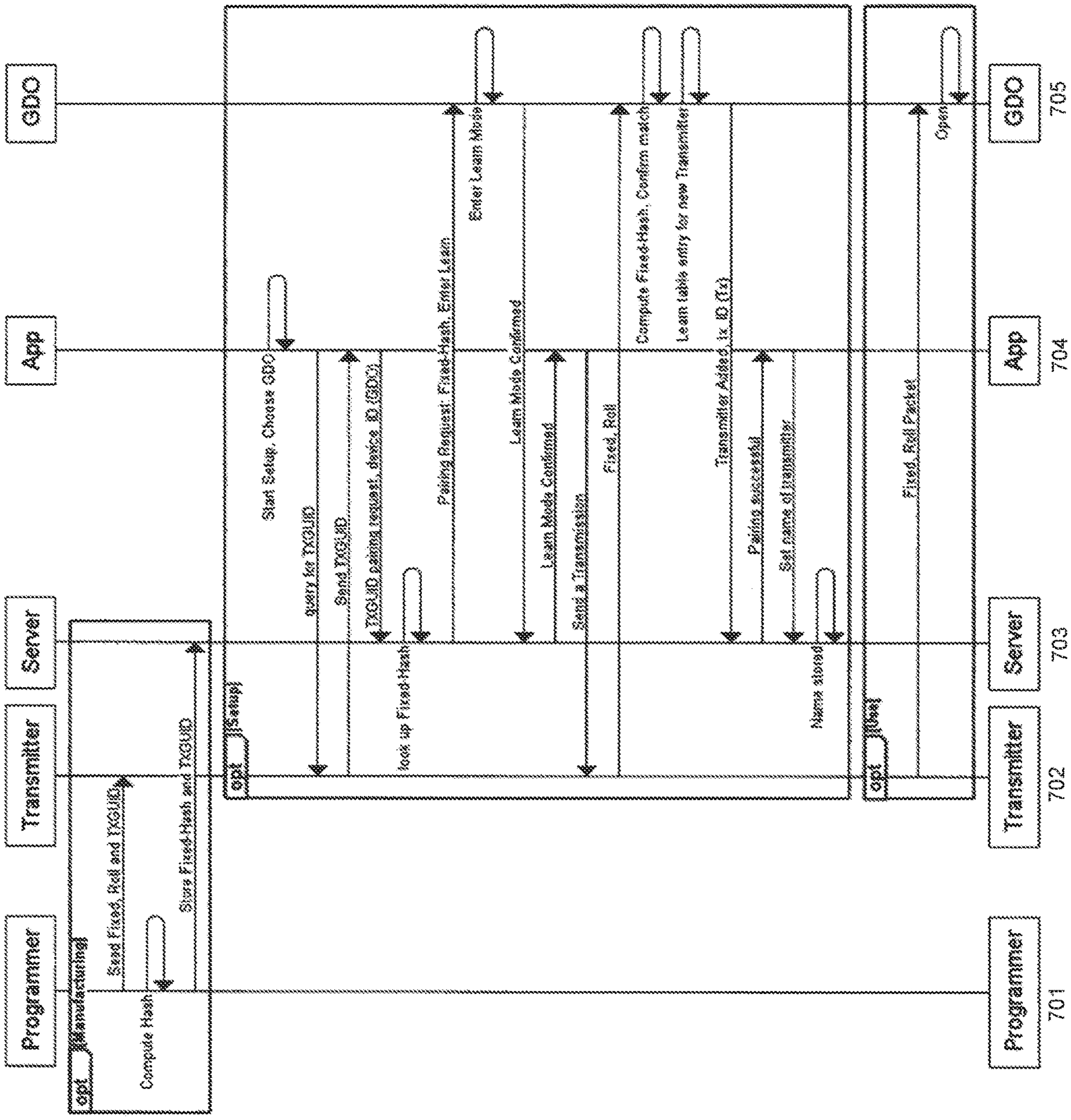
FIG. 7 is a messaging diagram of another example method for pairing a transmitter with a movable barrier operator.

Now referring to FIG. 7, an example process for pairing a transmitter with a movable barrier operator according to some embodiments is shown. In some embodiments, the operations in FIG. 7 may be performed using a transmitter programmer, a transmitter, a server, a pairing application running on a user device, and/or a movable barrier operator (such as a garage door opener (GDO) as shown in FIG. 7). In some embodiments, one or more operations in FIG. 7 may be performed by one or more of the user device 220, the transmitter 240, the server computer 210, and the movable barrier operator 230 described with reference to FIG. 2 herein.

During manufacturing, a transmitter programmer 701 of a manufacturer seeds a transmitter with a fixed code, a rolling code, and a transmitter globally unique identifier (TXGUID). The programmer 701 calculates and stores the hashed version of a fixed code and the TXGUID at a server 703.

Next as shown, a pairing application 704 starts the setup process and allows a user to select a garage door opener (GDO) 705. The device running the application 704 has stored or retrieves a movable barrier operator ID for the selected GDO 705. The application 704 queries the transmitter 702 for the TXGUID and receives the TXGUID in return. The application 704 then sends the TXGUID and the movable barrier operator device ID to the server 703 in a pairing request. In response to receiving the request, the server 703 looks up or calculates the hashed version of the fixed code associated with the TXGUID. The server 703 then communicates or generates a pairing request comprising the hashed version of the fixed code and an "enter learn mode" command to the selected GDO 705. In response, the GDO 705 may send a confirmation for learn mode to the server 703, which is forwarded to the application 704. The application 704 can then instruct the transmitter 702 (or alternatively prompt a user to actuate the transmitter 702) to send a transmission. The transmission from the transmitter 702 may comprise a fixed code and a rolling code. Upon receiving the transmission from the transmitter 702, the GDO 705 computes the hash of the transmitter fixed code and compares the hashed version of the received fixed code to the hashed version of the fixed code received from the server 703. If a match is confirmed, the GDO 705 adds a learn table entry for the transmitter 702. A "transmitter added" message, including the transmitter identifier, is then sent to the server 703. When the GDO 705 and the transmitter 702 are successfully paired, the server 703 sends the application 704 a message which then allows the application 704 to give a name to the transmitter to be stored at the server.

During operation of the movable barrier operator, the transmitter 702 sends a state change request including fixed code and a rolling code to the GDO 705, to actuate the movable barrier such as via a radio frequency signal. As shown in FIG. 7, once the setup process is completed, the transmitter is configured to control the movable barrier operator without further involvement of the application 704 and the server 703.

The operations in FIGS. 3-7 are provided as example processes according to some embodiments. In some embodiments, one or more operations in FIGS. 3-7 may be omitted, combined, or modified without departing from the spirit of the present disclosure. For example, the transmitter identifier and/or the hashed version of a fixed code may be obtained by the server through one or more ways described herein. The operator identifier may also be supplied from various sources including the user device, a movable barrier operator owner, and/or a third-party service. In some embodiments, enforcement of access conditions may be performed by the server, the movable barrier operator, and/or a third-party service communicating with the movable barrier operator. In some embodiments, the systems and methods described herein allow a network-enabled movable barrier operator to be operated by a new transmitter through the use of a hashed version of the transmitter fixed code to avoid transmitting the transmitter fixed code over the network. In some embodiments, the operator includes a learn table and a more temporary hash table (or two learn tables) that separately store codes associated with transmitters with permanent access and conditional access. In some embodiments, the hash table and the learn table may be collectively referred to as a dynamic learn table. In some embodiments, the learn table may be dynamically managed by the movable barrier operator and/or the server to enforce access conditions for a plurality of transmitters. In some embodiments, the user device may be used to program a transmitter to transmit a fixed code supplied by the server. For example, the server may generate a fixed code, send the fixed code to the user device which provides the fixed code to the transmitter, and/or send the fixed code or hashed version of the fixed code to the movable barrier operator such that the movable barrier operator can recognize the transmitter as an authorized transmitter.

While FIGS. 3-7 generally describes using hashed versions of transmitter fixed codes in the communications between user devices, the server, and movable barrier operators, in some embodiments, one or more operations described herein may be performed with unhashed transmitter fixed codes. For example, a pairing request may contain a transmitter fixed code that is sent to the movable barrier operator without being hashed. The movable barrier operator may then compare the received signal with the stored fixed code to determine whether the transmitter is authorized for access without performing a hash function on the received signal's fixed code.

In some embodiments, the systems and methods described herein use server/middleware connectivity to broker communications and access between a transmitter and a movable barrier operator that have not previously exchanged an RF radio packet. The server may have a trusted relationship with both the transmitter and operator. This server brokers an exchange where a token is given to the transmitter or operator to be used for long-term pairing or one-time access. This token can also be given a time to live or persist until it is revoked. In some embodiments, a movable barrier operator may be enhanced with this function. In some embodiments, one or more functions described herein may be added through a retrofit bridge such as a MyQ® smart garage hub from The Chamberlain Group, Inc.

In some embodiments, with the methods and systems described herein, a new transmitter may be added to a customer account to operate a movable barrier operator without having to pair the transmitter and the movable barrier operator locally after unboxing. Pairing and management of transmitters may be coordinated through an application and a server over a network. In some embodiments, a customer may pair a specific button or buttons of a transmitter, such as buttons of a HomeLink® transmitter, with network-connected operators remotely and be able to control a movable barrier with the convenience of pressing a physical button without operating their user device such as a mobile phone. The methods and systems described herein permit the buttons of a transmitter to each be paired with a different movable barrier. For example, the operation 311 may include determining an identifier of a button of the transmitter the user wants to program to operate a particular movable barrier operator. In one embodiment, the user may pair the first two buttons of a transmitter with two garage door openers of the user's home. After reserving a parking space using a parking space reservation application or website via the user device, the user may pair the third button of the transmitter with a movable barrier operator of a parking structure that contains the parking space. The user can then drive up to the parking structure and press the third button to cause the movable barrier operator of the parking structure to move the associated barrier. The user does not need to locally pair the transmitter and the movable barrier operator because a server of the parking space reservation service has already instructed a server associated with the movable barrier operator to pair the transmitter and the movable barrier operator upon the user reserving the parking space.

In some embodiments, the features described herein may comprise a modification to the movable barrier operator and/or may be added through a retrofit bridge. In some embodiments, the system allows identifying information for a transmitter to be inserted into a learn table when the transmitter is present. In some embodiments, the system allows the operator to accept a one-time command from a transmitter. In some embodiments, the system allows an un-provisioned HomeLink® button to be trained remotely to operate a movable barrier operator. In some embodiments, the operator may be configured to receive a fixed code generated by a server and then send an encrypted fixed/roll over a low-band radio channel to a user device and/or a transmitter. In some embodiments, the operator may send data representative of a fixed/roll code received over a low band radio channel to a server such as via the Internet for verification. In some embodiments, the operator may comprise a beacon transmitting a signal receivable by new users seeking to request access to the movable barrier operator.

In some embodiments, the transmitter may include a code to facilitate setup. In some embodiments, the transmitter may comprise a Bluetooth Low Energy (BLE) transceiver to facilitate setup from a user device such as a smartphone or tablet. In some embodiments, the BLE may also be used for firmware updates and/or dynamic fixed codes. In some embodiments, the BLE may be used to maintain constant communication with a mobile application on the smartphone even if an application for operating or adjusting the transmitter is only running in the background.

Figure 8:
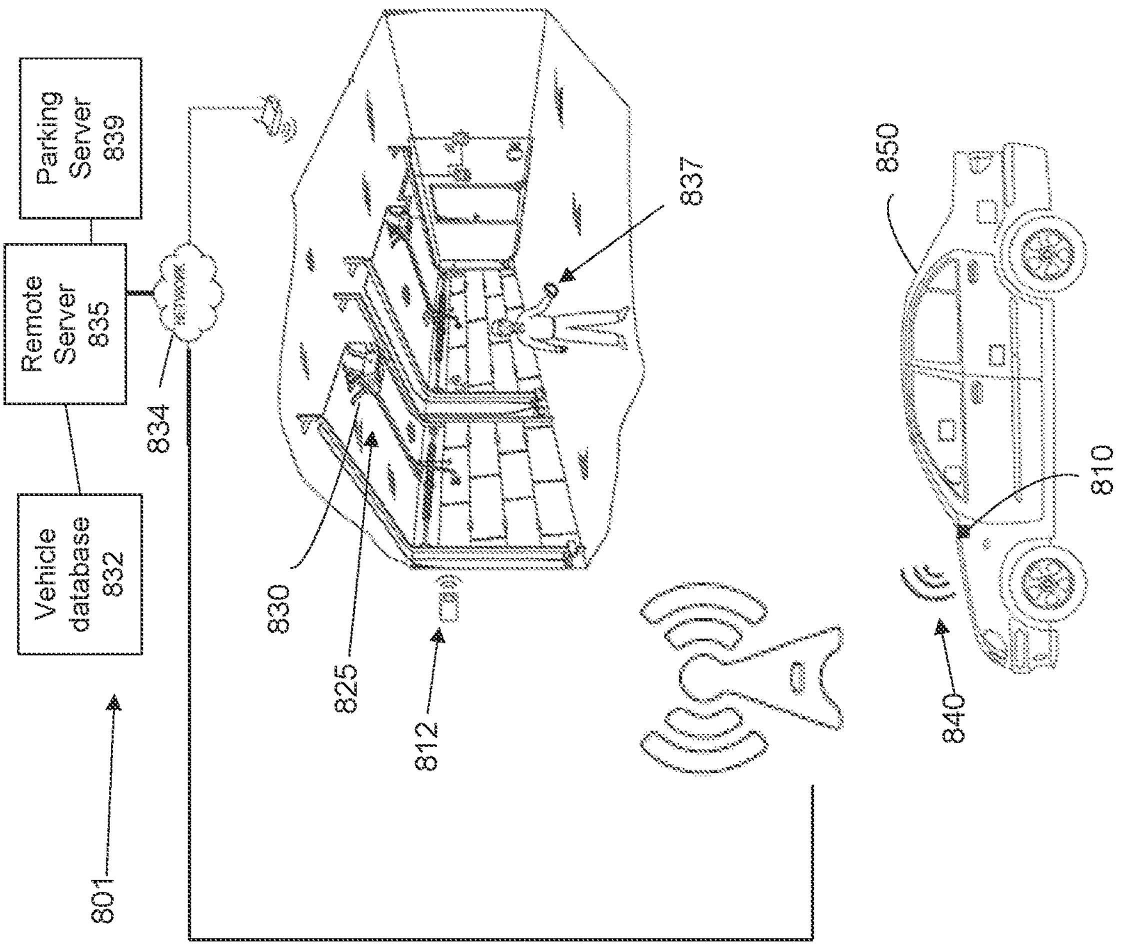
FIG. 8 is a schematic view of an example system for causing a movable barrier operator to learn one or more transmitters.

This disclosure provides a system and method to set up a remote control 812 for a controllable device 825, such as a movable barrier operator, light, or other electronic device. With reference to FIG. 8, a system 801 is provided including one or more remote controls 812, one or more controllable devices 825, and a remote server 835. The remote server 835 may include one or more computers that provide functionality for an account platform 1020 (see FIG. 10A), one or more of the remote controls 812, one or more controllable devices 825, and one or more interface systems 915 (see FIG. 11). The one or more controllable device 825 may include, for example, a movable barrier operator 830, a lightbulb, a lock, and/or a security system. The one or more remote controls 812 may include, for example, a keypad near a garage door, a portable electronic device, and/or a transmitter 810 of a vehicle 850. The transmitter 810 may include, for example, a transmitter built into the vehicle 850, a transmitter sold with the movable barrier operator 830 that may be clipped onto a visor of the vehicle 850, or an aftermarket universal transmitter that may be mounted in the vehicle 850. The universal transmitter may be programmable to operate movable barrier operators from different manufacturers. Regarding FIG. 11, the user interacts with the transmitter 810 via the interface system 915. The interface system 915 may take the form of, for example, a component of the vehicle 850 or a component of a user's device such as a desktop computer, a smartphone, or a tablet computer. The interface system 915 is operatively connected 1127 to the transmitter 810. The connection 1127 may be, for example, a permanent wired connection or a temporary connection such as via a short-range wireless communication protocol.

The transmitter 810 controls operation of the movable barrier operator 830 by sending a communication 840 to the movable barrier operator 830. The communication 840 may be communicated wirelessly via radio frequency (RF) signals in the 300 MHz to 900 MHz range. The communication 840 may include a fixed portion and a variable or changing (e.g., rolling code) portion. The fixed portion may include information identifying the transmitter 810 such as a unique transmitter identification (ID) and an input ID. If an input ID is used, the input ID may identify which button on the transmitter 810 causes the transmitter to send the particular communication 840. The transmitter IDs are fixed codes that are unique to each transmitter device 810. The variable portion of the communication 840 includes an encrypted code that changes, e.g., rolls, with each actuation of the input of the transmitter 810. As another example, the communication 840 may include a message communicated via cellular, Wi-Fi, WiMax, LoRa WAN, Bluetooth, Bluetooth Low Energy (BLE), Near Field Communication (NFC) or other approaches. The communication 840 may be direct, such as a radio frequency signal transmitted between the transmitter 810 and the controllable device 825. The communication may be indirect, such as a message communicated via one or more networks 834 to the remote server 835 and the remote server 835 sending an associated message to the controllable device 825.

In one embodiment, the system 801 permits a user to set up the transmitter 810 to operate the movable barrier operator 830 without having to cause the movable barrier operator 830 to enter a learning mode. This simplifies setup because the user does not have to manually cause the movable barrier operator 830 to enter the learn mode, nor does the transmitter 810 have to be operated to perform a trial-and-error approach to determine the correct signal characteristic(s) that will cause operation of the movable barrier operator 830. Rather, the remote server 835 communicates remote control information for the transmitter 810 to the movable barrier operator 830 and/or the transmitter 810. The remote control information may include, for example, a fixed component of the communication 840 such as a transmitter ID and a button ID and a variable component of the communication 840. As a few examples, the variable portion of the communication 840 may include an initial roll of a rolling code or may include data indicative of the rolling code so that the movable barrier operator 830 and/or the remote control 812 will be able to determine the current roll of the rolling code based on the data.

In one approach, the remote server 835 pushes the remote control information to the movable barrier operator 830. The remote server 835 causes the movable barrier operator 830 to learn the transmitter 810 and respond to signals 840 from the transmitter 810 by, for example, directing the movable barrier operator 830 to put the transmitter on a whitelist of learned transmitters. In another embodiment, the remote server 835 pushes the remote control information to the transmitter 810 and the transmitter 810 configures itself to use the remote control information to transmit communications 840 to the movable barrier operator 830. In another approach, the transmitter 810 and/or the movable barrier operator 830 will pull the remote control information from the remote server 835. The transmitter 810 and/or the movable barrier operator 830 may poll the remote server 835 according to a random or set time period or in response to an event, such as a user instructing the transmitter 810 to poll the remote server 835, to determine when there is remote control information to be pulled from the remote server 835.

Regarding FIG. 8, the system 801 may include a vehicle database 832 operated by a vehicle manufacturer or a supplier in communication with the remote server 835. The vehicle manufacturer database 832 may store a vehicle identification number (VIN) for the vehicle 850 and a transmitter ID for the transmitter 810. The vehicle manufacturer database 832 may also store information related to the changing code of the signal transmitted by the transmitter 810, such as a seed value. In one embodiment, the remote server 835 will query the vehicle database 832 upon the remote server 835 receiving a request for the movable barrier operator 830 to learn the transmitter 810. The vehicle database 832 sends the remote control information (e.g., a transmitter ID and changing code) for the transmitter 810 to the remote server 835, which communicates the remote control information for the transmitter 810 to the movable barrier operator 830. The movable barrier operator 830 then puts the remote control information for the transmitter 810 on the whitelist stored in the memory of the movable barrier operator 830. In this manner, the movable barrier operator 830 will respond to a communication 840 sent from the transmitter 810 because the communication 840 will include the remote control information on the whitelist.

Figure 9:
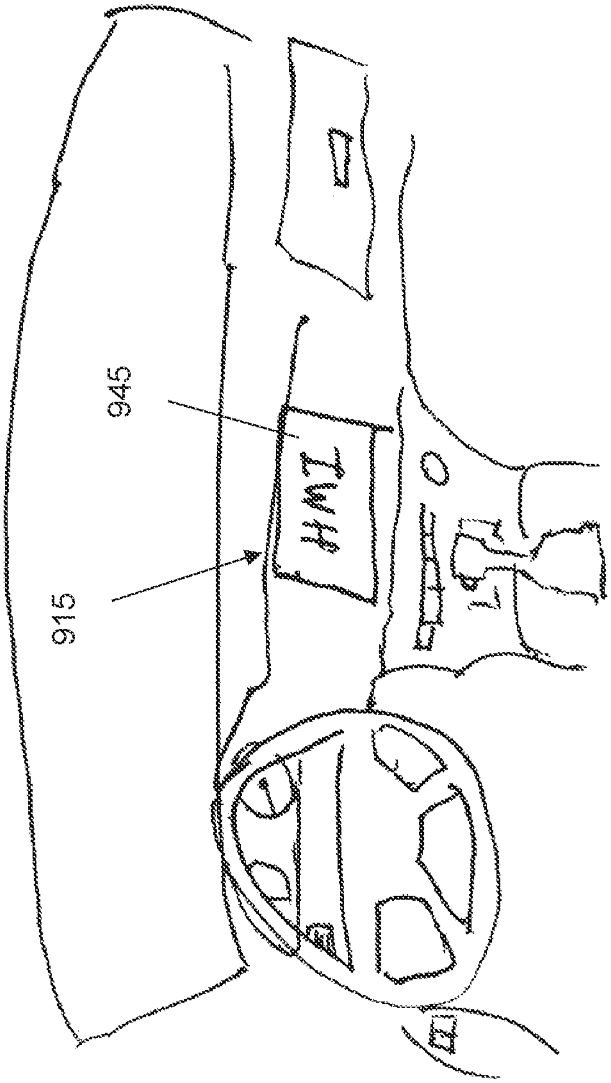
FIG. 9 is a perspective view an in-vehicle interface system including a human machine interface.

Regarding FIG. 8, the transmitter 810 may communicate with the movable barrier operator 830 by sending and/or receiving communications 840. The communications 840 may be transmitted wirelessly such as via radio frequency (RF) signals in the 300 MHz to 900 MHZ range. Regarding FIGS. 9 and 10A, the transmitter 810 may be operatively connected to an interface system 915 of the vehicle 850. The interface system 915 includes a human machine interface 945 that may include, for example, a display, a microphone, a speaker, or a combination thereof. The human machine interface 945 may include a vehicle infotainment system in a center stack of the vehicle 850 or an electronic dashboard as some examples. The human machine interface 945 may include one or more physical or virtual buttons that may be selected or actuated to program the transmitter 810 and operate the transmitter 810 when desired by a user. The display may include an icon of the account platform 1020 that causes the interface system 915 to operate the transmitter 810 and control the movable barrier operator 830. The transmitter 810 may be connected to a vehicle bus to receive power and communicate with components of the vehicle 850. In yet another embodiment, the human machine interface 945 includes physical buttons that are disposed on a driver-side visor, a rear-view mirror, or a dashboard of the vehicle 850. In another embodiment, the interface system 915 is a component of a user device such as the smartphone 837. The interface system 915 connects to the transmitter 810 by a communication device 1180 of the interface system 915 using a short-range wireless communication protocol such as Bluetooth.

The system 801 utilizes an account platform 1020 to configure and manage the remote controls 812 that are authorized to operate the movable barrier operator 830. The remote server 835 stores for a given user account, user account information including an ID of the movable barrier operator 830, information identifying the authorized remote controls including transmitter ID and button ID, and the user's login information for the user account. The user may utilize a computing device, such as a desktop computer, laptop computer, tablet computer, or smartphone 837 to provide the account information to the remote server 835. The computing device may connect to the remote server 835 via one or more networks including the internet.

In one embodiment, the user has an account configured for the account platform 1020 with which movable barrier operator 830 has been associated. The user may associate the transmitter 810 with the movable barrier operator 830 so that the transmitter 810 may operate the movable barrier operator 830. More specifically, upon the user entering the vehicle 850, such as when the user is purchasing the vehicle or renting the vehicle, the user may log into the user's account by selecting an icon for the account platform 1020 on a display of the human-machine interface 945 and entering the correct user name and password into the human-machine interface 945. In examples where the interface system 915 is a component of the vehicle 850, the vehicle 850 includes the communication device 1180 for connecting to the remote server 835 via one or more networks, such as a wireless wide area network and the internet. The one or more networks may include networks utilizing 4G LTE, 5G, LoRaWAN, WiMax approaches. The communication device 1180 of the vehicle 850 establishes a wireless connection for communications 840 that transmit and receive data from the remote server 835.

Upon the user successfully logging into the user's account, the remote server 835 communicates data indicative of the movable barrier operator 830 associated with the user's account. The human-machine interface 945 may display a graphical user interface that allows the user to select an input of the transmitter 810, which may be for example a physical button of the transmitter 810 or a digital button of the human-machine interface 945, to associate with the movable barrier operator 830. The user interacts with the human-machine interface 945, such as by pressing a portion of the display of the human-machine interface 945, to indicate which input of the transmitter 810 should be operable to cause the transmitter 810 to send the communication 840 to the movable barrier operator 830 and cause operation of the movable barrier operator 830. In another example, the human-machine interface 945 is configured to communicate with the user using audio, such as allowing the user to verbally select an input of the transmitter 810 to associate with a remote device 825.

Once the user associates the input of the transmitter 810 with the movable barrier operator 830, the remote server 835 communicates the remote control information for the transmitter 810 to the movable barrier operator 830 so that the movable barrier operator 830 will operate in response to receiving the communication 840 from the transmitter 810. The movable barrier operator 830 adds the remote control information to the whitelist of the movable barrier operator 830 and may thereby learn the transmitter 810 before the user drives the vehicle 850 away from the car dealership or car rental lot.

The remote server 835 facilitates operation of the account platform 1020 (see FIGS. 10A and 10B) of the user account. The account platform 1020 may include middleware and one or more user-facing applications that operate to connect the user to the details of her user account including the user's remote controls and controllable devices 825. For example, the account platform 1020 may include the myQ® application offered by Chamberlain® and running or installed in a user's smartphone 837 or the human-machine interface 945. As another example, the account platform 1020 may include a website accessible by an internet browser. The remote server 835 maintains a list of the controllable devices 825 associated with the user's account as well as the remote controls 812 that are authorized to operate the controllable devices 825. The remote server 835 may provide data representative of the list to the interface system 915. The human-machine interface 945 displays the account platform 1020, which in an embodiment includes icons graphically representing the controllable devices 825 and the remote controls 812, to the user and permits the user to readily select which user input on a given remote control 812 the user would like to cause one or more of the controllable devices 825 to learn. The input of the remote control 812 may be a physical button, an icon displayed on a screen, or a spoken secret word as some examples.

Figure 10A:
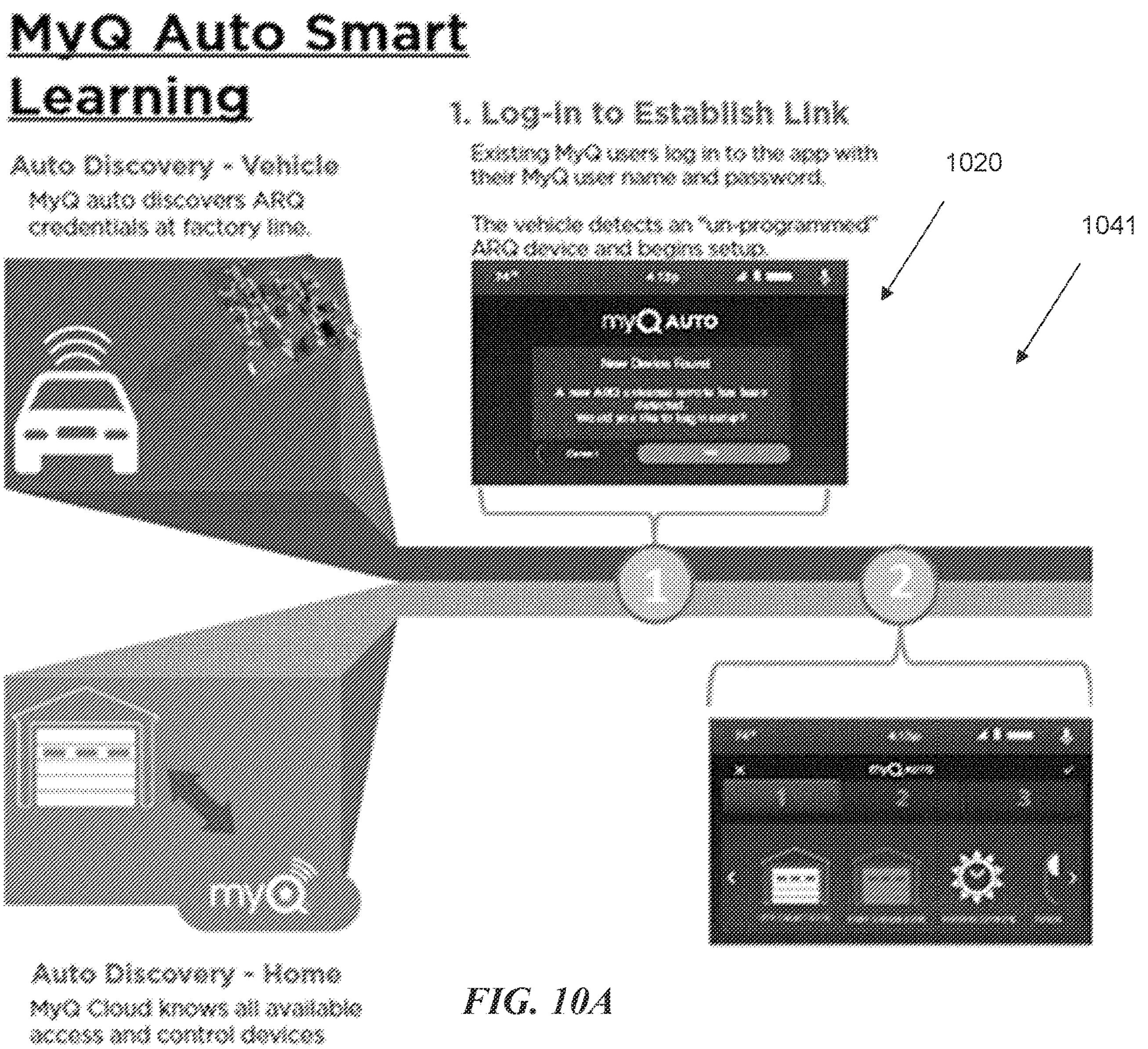
FIGS. 10A and 10B are portions of a flow diagram of an example method to associate a remote control with a movable barrier operator.
Figure 10B:
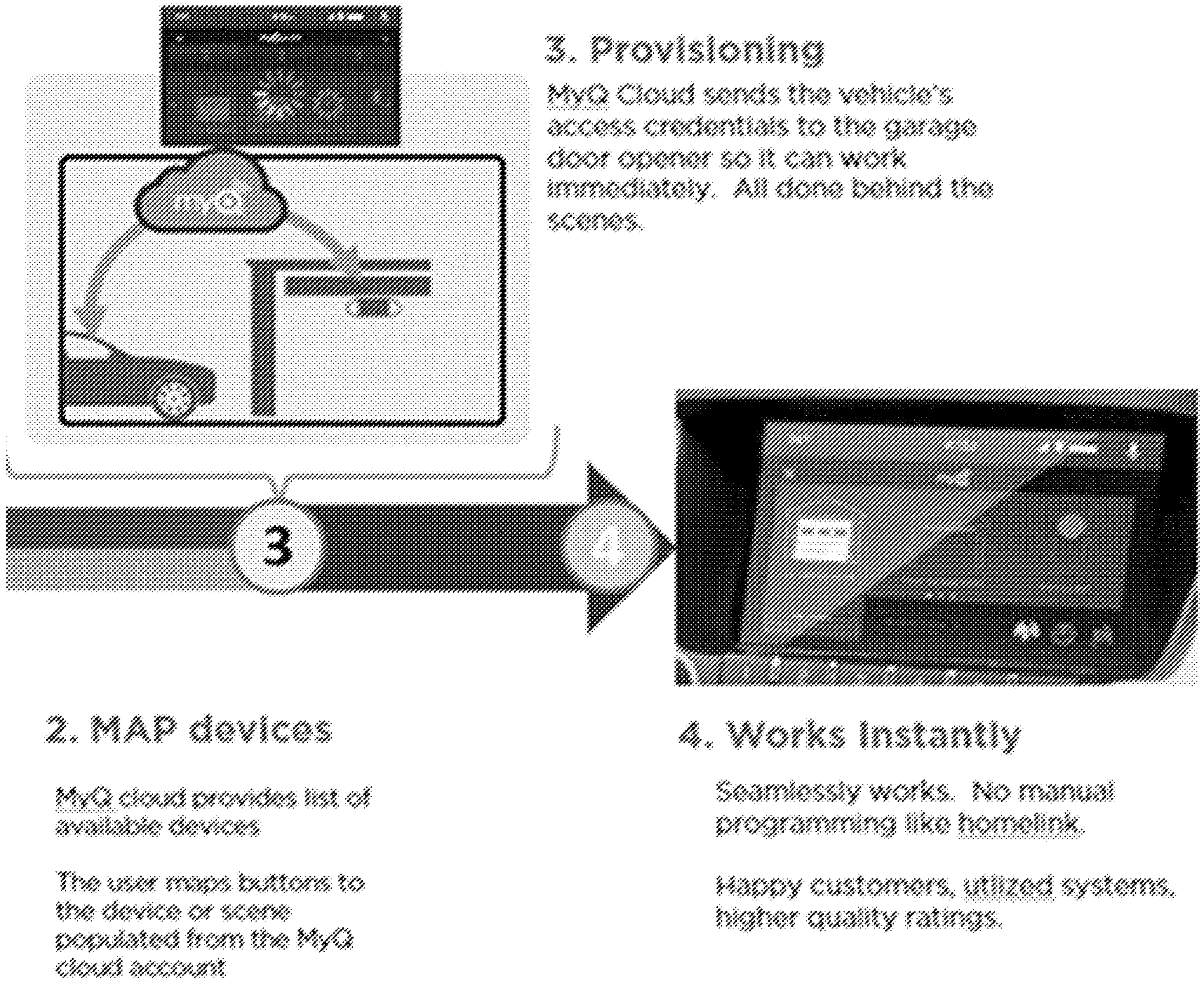

With reference to FIGS. 10A and 10B, a method 1041 is provided as an example of how a transmitter of a vehicle may be learned by a movable barrier operator in accordance with the disclosures herein. Although the method 1041 discloses learning of a vehicle transmitter by a movable barrier operator, the method 1041 may be similarly utilized to cause other controllable devices 825 to learn one or more remote controls. For example, the controllable devices 825 may include a light, a security system, a lock, or a combination thereof.

In one embodiment, the controllable device 825 is configured to delete the remote control information for the transmitter 810 from the whitelist of the controllable device 825 after the transmitter 810 has operated the controllable device 825 using the communication 840. For example, a user may purchase a one-time use of a parking spot of a parking lot/garage using a parking application running on the user's smartphone 837. A parking server 839 (see FIG. 8) associated with the parking application communicates with the remote server 835 and causes the remote server 835 to send the remote control information of the transmitter 810 to a controllable device 825 (e.g. such as a gate operator) of a parking garage that contains the parking spot. The remote server 835 may also communicate a number of entries permitted by the vehicle 850, such as one entry or ten entries, for example. Alternatively or additionally, the remote server 835 may communicate a parking time window/duration after which the user may incur additional charges or fees if the vehicle has not timely exited the parking garage. The gate operator adds the remote control information for the transmitter 810 to the whitelist of the gate operator. When the user pulls up to the gate operator and causes the transmitter 810 to transmit the communication 840, the gate operator recognizes the communication 840 and opens the gate. After the vehicle 850 has pulled into the parking garage, the gate operator erases the transmitter 810 from the whitelist if the number of entries indicated by the remote server 835 is one. If the number of entries is one, the remote control information may include the transmitter ID but not the variable component of the communication 840. This is because the gate operator need only identify the transmitter 810 for the single use and is not concerned with a subsequent roll of the variable component. If the number of entries is greater than one, the gate operator may locally monitor of the number of entries and delete the remote control information for the transmitter 810 upon the number of entries being reached. Alternatively, the remote server 835 and/or the gate operator may monitor the number of entries and the gate operator sends a communication to the gate operator after each time the transmitter 810 has operated the gate operator. In the parking garage or other access-limited applications, the user may program a particular input of the transmitter 810 to be the default input for movable barrier operators the user gains access to using the parking application.

In another embodiment, the transmitter 810 is programmed with information from the controllable device 825, rather than the controllable device 825 being sent remote control information for the transmitter 810. For example, in the parking garage context, once the user associates the input of the transmitter 810 with the controllable device 825, the remote server 835 or the controllable device 825 sends a communication to the transmitter device 810. The communication contains remote control information that the transmitter 810 uses to actuate the selected controllable device 825, such as a transmitter ID and/or a code. The transmitter 810 configures itself to send the communication 840 with the transmitter ID and a changing code. The controllable device 825 may learn the changing code if the communication 840 contains the transmitter ID that the controllable device 825 is expecting.

For applications where the controllable device 825 includes a movable barrier operator 830 such as a garage door opener or a gate operator, the ability of the gate operator to temporarily learn remote controls 812 provides intelligent access control for a number of different types of applications. For example, the movable barrier operator 830 may learn a transmitter 810 of a driver of a delivery service for a single use so that the delivery driver may gain access to a garage or a gated community to deliver a package. As another example, the movable barrier operator 830 may learn a transmitter 810 of emergency personnel so that the emergency personnel may readily open a gate of a gated community to gain access to a home in the community. The transmitter 810 of emergency personnel may be a small transmitter built into or part of the equipment or clothing of emergency personnel. For example, the transmitter 810 of the emergency personnel could be attached near or on their radio communication devices or bodycam. The small transmitter may share power with the communication devices or bodycam, or the small transmitter may have its own battery. As another example, the controllable device 825 may include an access control device for residential communities. One example of such a device is the Connected Access Portal, High Capacity (CAPXL) sold by LiftMaster®. The access control device may learn remote controls according to the foregoing discussion and open a lock or a gate associated with the access control device upon receiving a communication 840 from a learned remote control 812.

Figure 11:
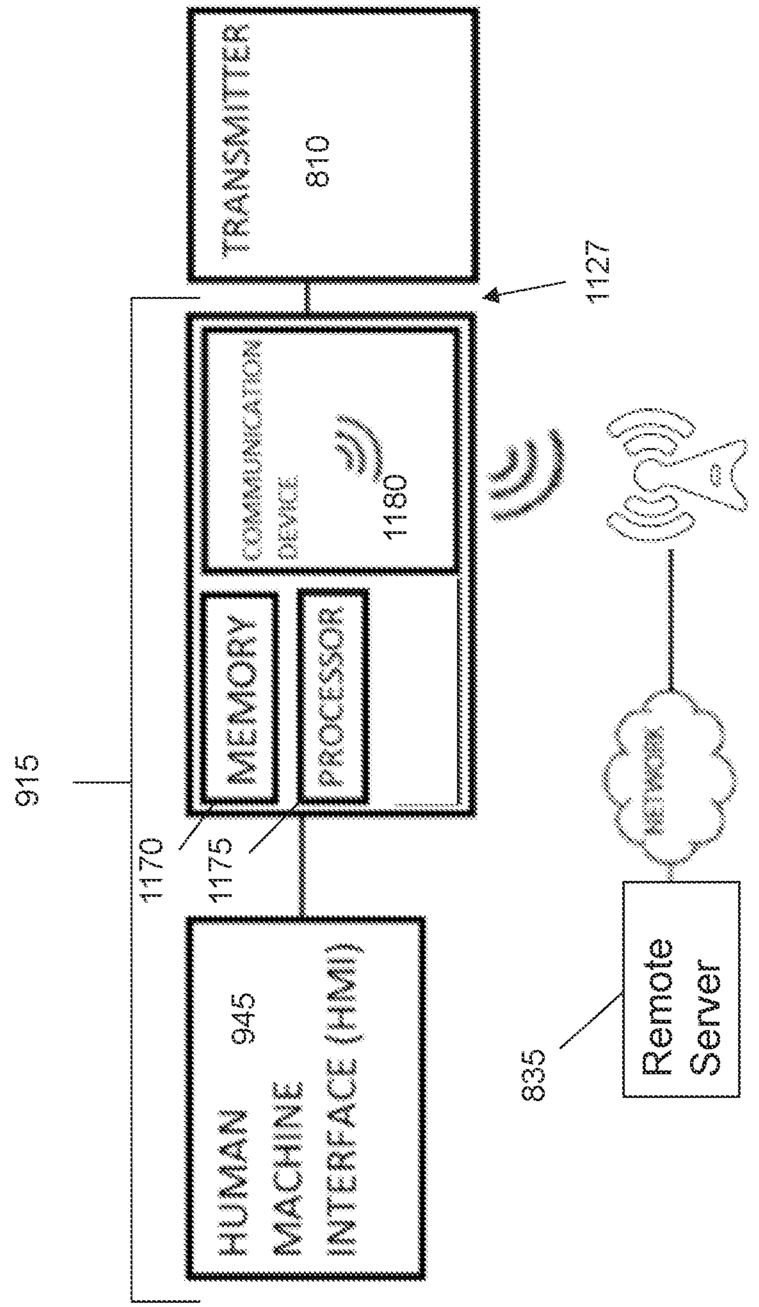
FIG. 11 is a schematic view of an interface system communicating with a remote server.

Regarding FIG. 11, the interface system 915 is configured to allow the user to select which transmitter input should be associated with one or more controllable devices 825. The interface system 915 includes a processor 1175 in communication with a memory 1170 and a communication device 1180. The communication device 1180 may communicate using wired or wireless approaches, including short-range and long-range wireless communication protocols. The processor 1175 may operate the account platform 1020 and receive information regarding a user's account via the communication device 1180, such as information regarding the remote controls 812 and controllable devices 825 associated with the user's account.

As noted previously, the interface system 915 may be a component of the vehicle 850, may be a component of a portable electronic device such as smartphone 837, or may be another device. The account platform 1020 may receive account login information via the human-machine interface 945. The login information includes at least one user credential such as, for example, a username and password, biometric information, etc. Once the remote server 835 verifies the at least one user credential, the remote server 835 provides information to the interface system 915 regarding the controllable devices 825 associated with the user's account that are available to learn the transmitter 810. The interface system 915 also displays the transmitter 810 inputs that are available to be programmed and associated with one or more of the controllable devices 825 associated with the user's account. The platform 1020 allows a user to associate a button of a transmitter 810 with a controllable device 825. The platform 1020 can do this in a variety of ways. In one example, the platform 1020 causes the interface system 915 to display the transmitter 810 inputs and the controllable devices 825 associated with the user's account on a screen. The user then selects, using the human-machine interface 945, one of the controllable devices 825 and selects one of the inputs of the transmitter 810. The interface system 915 then prompts or asks the user to press a digital "Accept" button or to otherwise confirm that the user would like to associate the selected controllable device 825 with the selected input of the transmitter 810. Once the user confirms the association, the processor 1175 of the interface system 915 causes the communication device 1180 to communicate a message to the remote server 835 requesting the selected controllable device 825 learn the remote control information for the selected input of the transmitter 810. In another example, the human-machine interface 945 displays the available inputs of transmitter 810 inputs on one screen. The user then selects the input of the transmitter 810 to be programmed. Next, the human-machine interface 945 displays a screen that displays the controllable devices 825 available to associate with the previously selected input of the transmitter 810. The user selects the desired controllable device 825 and the processor 1175 causes the communication device 1180 to communicate a message to the remote server 835 requesting the selected controllable device 825 learn the remote control information for the selected input of the transmitter 810.

The user credential for accessing the user's account may take a variety of forms. In one embodiment, the user credential is a username and a password for the account. In another embodiment, the user credential is provided by the user's smartphone 837. For example, the user's smartphone 837 may include a digital token that is passed to the interface system 915 of the vehicle 850. The communication of the user credential from the smartphone 837 to the interface system 915 may be done automatically upon pairing the smartphone 837 and the interface system 915 or the user may be prompted to authorize the communication. In another embodiment, the user credential may be a device ID of the smartphone 837 which the interface system 915 of the vehicle 850 and/or the remote server 835 recognizes to be an authorized device associated with the user's account.

In another embodiment, the user may be signed into the account platform 1020 on the user's smartphone 837, such as a myQ® account on the myQ® application or service. Upon the smartphone 837 connecting to the communication device 1180 of the interface system 915 of the vehicle 850, the smartphone 837 communicates the user credentials to the communication device 1180. In one embodiment, the user credential may be communicated to the interface system 915 via near field communication (NFC). In another embodiment, the user credential may include biometric information of the user read by the interface system 915, such as a fingerprint as one example.

Having the user credential associated with a user's portable electronic device, such as the smartphone 837, allows for a number of additional features. For example, the user may be able to operate their controllable devices 825 using a new or unprogrammed transmitter of a new vehicle upon the user entering the vehicle and the user's smartphone 837 pairing with vehicle. In one example, when the user enters a new vehicle that includes an interface system 915, the user's smartphone 837 connects to the interface system 915 and automatically configures the interface system 915 for use with one or more controllable devices 825 known by or otherwise associated with the user's account on platform 1020. The interface system 915 of the new vehicle receives information from the remote server 835 regarding the controllable devices 825, remote controls 812, and inputs of the remote controls 812 that are associated with the user's account. The interface system 915 configures itself so that the inputs of the human machine interface 945 will cause operation of the associated controllable devices 825 according to the settings of the user's account. For example, if the user's account specifies that a first button of a mirror-mounted transmitter 810 in the user's primary vehicle causes operation of the user's garage door opener, the interface system 915 of a rental car will automatically communicate remote control information for the transmitter 810 of the rental car with the remote server 835 so that the transmitter 810 of the rental car will transmit a signal that causes operation of the user's garage door opener when the user presses a first button of a mirror-mounted transmitter 810 of the rental car. When the user and her smartphone 837 exits the rental car, the interface system 915 automatically signs the user out of her account on the account platform 1020. As another example, a user may have the interface system 915 of the user's vehicle 850 programmed to access a parking garage at work with the pressing of a particular button of the transmitter 810 of the vehicle 850. If the user takes her spouse's vehicle to work, the user's smartphone 837 will automatically sign into their account of the account platform 1020 provided by the interface system 915 of the spouse's vehicle. The interface system 915 may automatically communicate with the remote server 835 so that the user's pressing of a similar button in the spouse's vehicle will operate the parking garage at work.

As one example, a user has programmed buttons on the user's primary vehicle 850 through the user's myQ® account and has a myQ® application on the user's smartphone 837. The vehicle 850 includes an interface system 915 and a transmitter 810 built into the vehicle. The human machine interface 945 includes an infotainment system running a myQ® application. The user sets up the user's myQ® account so that: a) pressing a first virtual button displayed on a display of the infotainment system of the rental car causes the transmitter 810 of the vehicle 850 to transmit a signal that operates a garage door opener; and b) pressing a second virtual button displayed on the display causes the transmitter 810 to transmit a signal that operates a light in the user's home. The user may, at some point, enter a secondary vehicle, such as a rental car, having an interface system 915 and a transmitter 810. When the user activates, drives or otherwise uses the secondary vehicle 850, the user's smartphone 837 automatically communicates with a myQ® application of the interface system 915 and signs into the user's myQ® account. The interface system 915 then configures the virtual buttons on the infotainment system to match the virtual buttons in the user's primary vehicle 850 according to the user's myQ account settings. When the user presses the second virtual button, the transmitter 810 of the secondary vehicle 850 transmits a signal that causes operation of the light in the user's home. The interface system 915 in the secondary vehicle 850 thereby provides similar functionality as the interface system 915 in the primary vehicle 850 upon the interface system 915 receiving the user credentials for the myQ account, the interface system 915 communicating the remote control information for the transmitter 810 of the secondary vehicle to the remote server 835, and the remote server 835 requesting the controllable devices 825 associated with the myQR account learn the remote control information for the transmitter 810 of the secondary vehicle. Instead of using the smartphone 837, the user may sign into their myQ® account manually using the human-machine interface 945 of the secondary vehicle. Alternatively, users can have their preferred transmitter 810 input associations with controllable devices 825 stored in a vehicle key fob that communicates with the interface system 915 of a vehicle to cause the interface system 915 to automatically configure itself according to the user's settings in the myQ® account once the user and her key fob enter the vehicle.

The inputs of the remote controls 812 and the controllable devices 825 can be associated using the interface system 915 in a number of approaches. In one approach, after the user selects an input of a remote control 812 to associate with a controllable device 825, the interface system 915 sends to the remote server 835 the transmitter ID of the remote control 812, the input ID of the selected input, and, optionally, a current changing code (e.g., rolling code) of the remote control 812. The remote server 835 stores this remote control information and sends the remote control information to the controllable device 825. When the user is in proximity to the controllable device 825 and operates the remote control 812, the remote control 812 transmits a signal including the transmitter ID, the input ID, and a changing code. If the transmitter ID and input ID sent from the remote control 812 matches the expected transmitter ID and input ID received at the controllable device 825 from the remote server 835, the controllable device 825 actuates and stores the transmitter ID, input ID, and (optionally) the changing code in a memory of the controllable device 825. The controllable device 825 may also compare the changing code from the remote server and the changing code received from the remote control 812 to confirm the remote control 812 is authorized to operate the controllable device 825. The controllable device 825 reports actuation to the remote server 835, such as for reconciliation of use and fee-charging in a parking garage context. In another embodiment, to ensure the controllable device 825 utilizes the correct changing code algorithm, the controllable device 825 predicts an expected changing code and waits for the remote control 812 to send another signal containing a second changing code. The controllable device 825 will actuate and learn the remote control 812 if the second changing code matches the expected changing code.

In another embodiment, the user's smartphone 837 contains the interface system 915 displaying the account platform 1020 and the user selects an input of a remote control 812 to associate with a controllable device 825 using the account platform 1020 on the smartphone 837. The smartphone 837 communicates the user selection to the remote server 835. The remote server 835 retrieves remote control information for the selected remote control 812 from a memory of the remote server 835. The remote control information includes a transmitter ID and optionally an input ID and/or a changing code of the selected remote control 812. The remote server 835 communicates the remote control information to the controllable device 825, which stores the remote control information in a memory of the controllable device 825. When the remote control 812 is operated to send a local radio frequency signal to the controllable device 825, the controllable device 825 receives the local radio frequency signal. The controllable device 825 validates the remote control 812 by comparing the transmitter ID, input ID, and changing code of the local radio frequency signal to the remote control information received from the remote server 835. The controllable device 825 learns the remote control 812 upon the transmitter ID, input ID, and changing code of the local radio frequency signal corresponding to the transmitter ID, input ID, and changing code of the remote control information the controllable device 825 received from the remote server 835.

In another example, the user associates an input of a remote control 812 with a controllable device 825 using the account platform 1020 such as with the smartphone 837, a tablet computer, or a desktop computer. The remote server 835 sends a message to the controllable device 825 indicating the user wants to associate the remote control 812 with the controllable device 825. The controllable device 825 sends a response message to the remote server 835 containing remote control information for use by the remote control 812 such as one or more of a transmitter ID, button ID, and a changing code. The remote server 835 sends the remote control information to the remote control 812, and the remote control 812 configures itself according to the remote control information. The remote control 812 may use the changing code from the controllable device 825 as a starting point and may change the changing code (e.g., index a rolling code) with each transmission by the remote control 812. The controllable device 825 predicts the changing code using known techniques.

In yet another example, upon the user associating a remote control 812 with a controllable device 825 via the account platform 1020, the remote server 835 generates remote control information including one or more of a transmitter ID, input ID, and a changing code and communicates this generated remote control information to the controllable device 825 and the remote control 812. Upon the user actuating the remote control 812, the remote control 812 transmits a local radio frequency signal to the controllable device 825 including the one or more of the transmitter ID, input ID, and changing code received from the remote server 835. The controllable device 825, having received the remote control information from the remote server 835, expects to receive the remote control information from the remote control 812. Upon the device 825 receiving the remote control information locally from the remote control 812, the controllable device 825 whitelists the remote control 812 and may actuate.

In still another example, the vehicle 850 must be in proximity to the controllable device 825 for setup. Upon the user selecting which transmitter 810 button of the vehicle 850 to associate with which controllable device 825 via the account platform 1020, the remote server 835 sends a signal to the controllable device 825 putting the controllable device 825 in learn mode. The server then sends a signal over the network to the vehicle 850 causing the transmitter 810 to transmit different radio frequency communications 840 to the controllable device 825. Once the controllable device 825 receives a compatible communication 840, the controllable device 825 learns the transmitter 810. The controllable device 825 then sends a communication to the transmitter 810, either directly via a radio frequency signal or indirectly via the network 834 and the remote server 835, indicating the communication 840 the controllable device 825 has learned.

Figure 12:
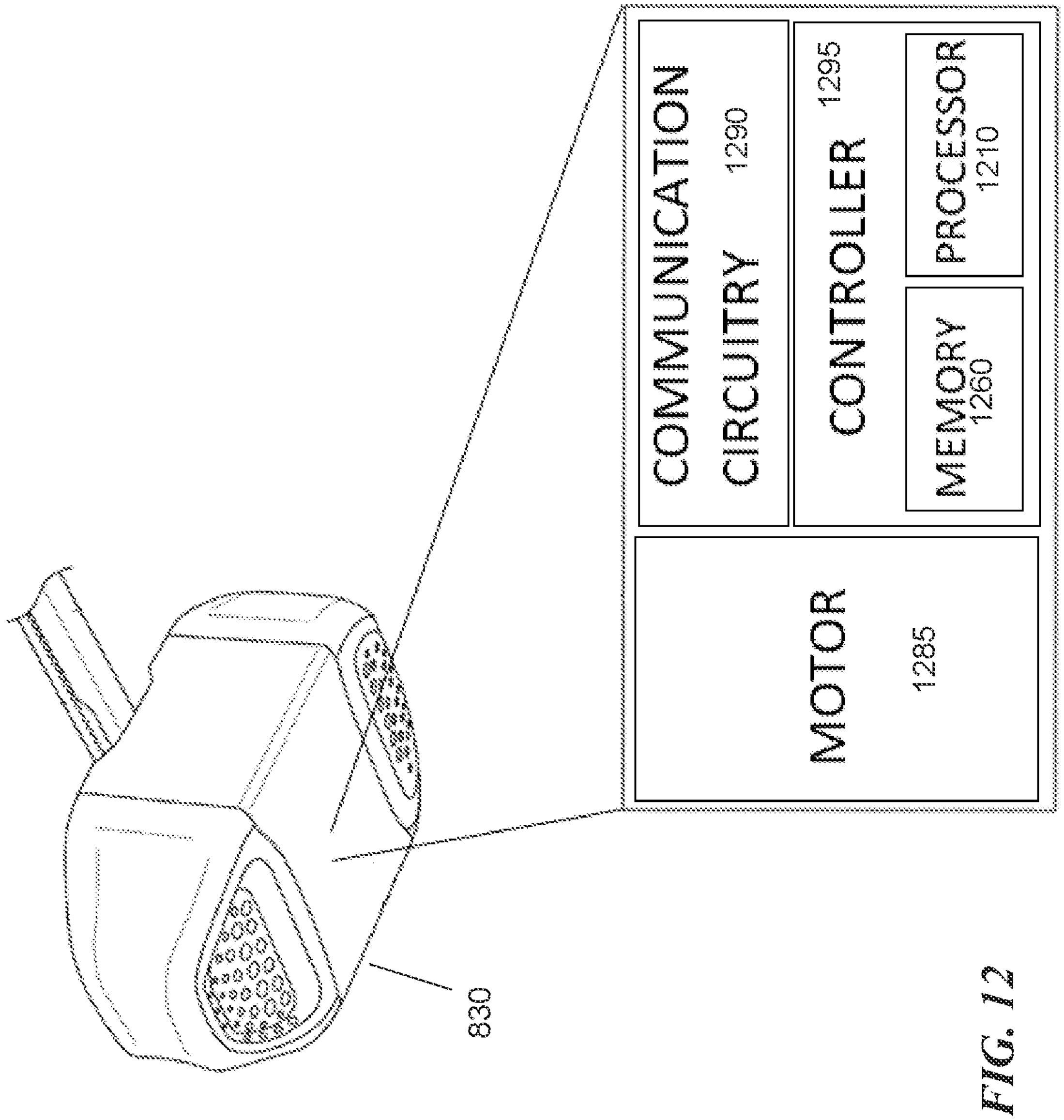
FIG. 12 is a schematic view of an example movable barrier operator.

The one or more controllable devices 825 can be any type of device that can be actuated or controlled remotely. Example controllable devices 825 include movable barrier operators, garage door operators, gates, doors, lights, etc. Regarding FIG. 12, the controllable device 825 may include the movable barrier operator 830 discussed above with respect to FIG. 8. The movable barrier operator 830 shown comprises a motor 1285, communication circuitry 1290, and a controller 1295 comprising a memory 1260 and a processor 1210. The one or more controllable devices 825 are capable of communicating over one or more networks 834 with the remote server 835 and/or the remote controls 812. For example, the one or more controllable devices 825 may be capable of wirelessly connecting to a wireless access point, such as a Wi-Fi router, and communicating with the remote server 835 via the internet.

It is intended that the phrase "at least one of" as used herein be interpreted in the disjunctive sense. For example, the phrase "at least one of A and B" is intended to encompass only A, only B, or both A and B. Those skilled in the art will recognize that a wide variety of modifications, alterations, and combinations can be made with respect to the above-described embodiments without departing from the scope of the invention and that such modifications, alterations, and combinations are to be viewed as being within the ambit of the inventive concept.

The invention claimed is:

1. A transmitter apparatus comprising:

communication circuitry configured to communicate with a remote computer via a network; and a processor operably coupled to the communication circuitry and configured to:

generate a transmitter pairing request for pairing the transmitter apparatus with a movable barrier operator, communicate the transmitter pairing request to the remote computer via the communication circuitry, wherein the remote computer is configured to verify the transmitter pairing request and thereby send an add transmitter request to the movable barrier operator including a transmitter fixed code associated with the transmitter apparatus, receive the transmitter fixed code from the remote computer in response to the transmitter pairing request, and program the transmitter apparatus to transmit a modified radio frequency control signal including the transmitter fixed code to the movable barrier operator for actuating a movable barrier operatively coupled with the movable barrier operator.

2. The transmitter apparatus of claim 1, wherein the transmitter pairing request comprises at least one of: a unique transmitter identification (ID) and an input ID identifying a button on the transmitter apparatus.

3. The transmitter apparatus of claim 1, wherein the transmitter pairing request includes a variable component.

4. The transmitter apparatus of claim 3, wherein the variable component comprises an initial roll of a rolling code.

5. The transmitter apparatus of claim 3, wherein the variable component comprises data indicative of a rolling code.

6. The transmitter apparatus of claim 1, wherein the remote computer pushes the transmitter pairing request to the movable barrier operator, causing the movable barrier operator to learn the transmitter apparatus and respond to signals from the transmitter apparatus.

7. The transmitter apparatus of claim 1, wherein the remote computer pushes remote control information to the transmitter apparatus in response to the transmitter pairing request, the remote control information including the transmitter fixed code associated with the movable barrier operator.

8. The transmitter apparatus of claim 7, wherein the processor uses the remote control information to configure the transmitter apparatus to transmit communications to the movable barrier operator.

9. The transmitter apparatus of claim 1, wherein the transmitter pairing request comprises a movable barrier operator identifier received from a broadcast beacon or an access brokering service.

10. The transmitter apparatus of claim 1, further comprising:

at least two buttons, wherein one of the at least two buttons is associated with the transmitter pairing request.

11. A method for transmitter programming, the method comprising:

generate, by a processor of a transmitter apparatus, a transmitter pairing request for pairing the transmitter apparatus with a movable barrier operator;

send, by the processor of the transmitter apparatus, the transmitter pairing request to a remote computer via communication circuitry operably coupled to the processor of the transmitter apparatus, wherein the remote computer is configured to verify the transmitter pairing request and thereby send an add transmitter request to the movable barrier operator including a transmitter fixed code associated with the transmitter apparatus;

in response to sending the transmitter pairing request, receive, by the processor of the transmitter apparatus from the remote computer, the transmitter fixed code; and program, by the processor of the transmitter apparatus, the transmitter apparatus to transmit a modified radio frequency control signal including the transmitter fixed code to the movable barrier operator for actuating a movable barrier operatively coupled with the movable barrier operator.

12. The method of claim 11, wherein the transmitter pairing request comprises at least one of: a unique transmitter identification (ID) and an input ID identifying a button on the transmitter apparatus.

13. The method of claim 11, wherein the transmitter pairing request includes a variable component.

14. The method of claim 13, wherein the variable component comprises an initial roll of a rolling code.

15. The method of claim 13, wherein the variable component comprises data indicative of a rolling code.

16. The method of claim 11, wherein the remote computer pushes the transmitter pairing request to the movable barrier operator, causing the movable barrier operator to learn the transmitter apparatus and respond to signals from the transmitter apparatus.

17. The method of claim 11, wherein the remote computer pushes remote control information to the transmitter apparatus in response to the transmitter pairing request, the remote control information including the transmitter fixed code associated with the movable barrier operator.

18. The method of claim 17, wherein the processor uses the remote control information to configure the transmitter apparatus to transmit communications to the movable barrier operator.

19. The method of claim 11, wherein the transmitter pairing request comprises a movable barrier operator identifier received from a broadcast beacon or an access brokering service.

20. An apparatus comprising:

communication circuitry configured to communicate with a remote computer via a network;

a processor operably coupled to the communication circuitry and configured to:

generate a transmitter pairing request for pairing the apparatus with a movable barrier operator, communicate the transmitter pairing request to the remote computer via the communication circuitry, wherein the remote computer is configured to verify the transmitter pairing request and thereby send an add transmitter request to the movable barrier operator including a transmitter fixed code associated with the apparatus, receive the transmitter fixed code from the remote computer in response to the transmitter pairing request, and program the apparatus to transmit a modified radio frequency control signal including the transmitter fixed code to the movable barrier operator for actuating a movable barrier operatively coupled with the movable barrier operator; and at least two buttons, wherein one button of the at least two buttons is associated with the transmitter pairing request, the transmitter pairing request further including a unique transmitter identification (ID) and an input ID identifying the one button.

* * * * *